(12) United States Patent
Masui et al.

(10) Patent No.: US 11,615,111 B2
(45) Date of Patent: Mar. 28, 2023

(54) COMPUTER-READABLE RECORDING MEDIUM FOR STORING DATA PROCESSING PROGRAM, DATA PROCESSING METHOD, AND DATA PROCESSING APPARATUS

(71) Applicant: FUJITSU LIMITED, Kawasaki (JP)

(72) Inventors: Motoo Masui, Inagi (JP); Masayoshi Shimizu, Hadano (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/306,989

(22) Filed: May 4, 2021

(65) Prior Publication Data
US 2022/0058204 A1 Feb. 24, 2022

(30) Foreign Application Priority Data
Aug. 18, 2020 (JP) .............................. JP2020-137907

(51) Int. Cl.
*G06F 16/25* (2019.01)
*G06F 16/23* (2019.01)
(Continued)

(52) U.S. Cl.
CPC ........ *G06F 16/258* (2019.01); *G06F 16/1794* (2019.01); *G06F 16/2308* (2019.01); *G06F 16/2315* (2019.01); *G06F 16/2322* (2019.01); *G06F 16/2329* (2019.01); *G06F 16/2336* (2019.01); *G06F 16/2343* (2019.01); *G06F 16/2358* (2019.01); *G06F 16/27* (2019.01)

(58) Field of Classification Search
CPC .............. G06F 16/258; G06F 16/2308; G06F 16/2358; G06F 16/1794; G06F 16/2315; G06F 16/2322; G06F 16/2329; G06F 16/2336; G06F 16/2343; G06F 16/27
See application file for complete search history.

(56) References Cited

U.S. PATENT DOCUMENTS 9,317,494 B2 * 4/2016 Walter ..................... G06F 40/18
2008/0183689 A1 * 7/2008 Kubota ............... G06F 16/2471
(Continued)

FOREIGN PATENT DOCUMENTS

JP H11-53360 A 2/1999
JP 2008-108144 A 5/2008

*Primary Examiner* — Kris E Mackes
*Assistant Examiner* — Lin Lin M Htay
(74) *Attorney, Agent, or Firm* — Fujitsu Patent Center

(57) ABSTRACT

A method includes: repeatedly executing a first processing configured to generate, in response to input of conversion examples of values set, a conversion program for converting values of records, convert the values of the records by executing the conversion program, and display a conversion result; and executing a second processing configured to select one or more second records from the records, each of the one or more records being a record on an upper side of a first record, the first record being a record for which a conversion example is added in second or subsequent input, determine whether a value of each second record is changed in a latest conversion result from a previous conversion result, and in response that a value of the second record is changed, cause the first processing to highlight a value of the second record in display of the latest conversion result.

7 Claims, 29 Drawing Sheets

(51) Int. Cl.
*G06F 16/178* (2019.01)
*G06F 16/27* (2019.01)

(56) References Cited

U.S. PATENT DOCUMENTS

2010/0191760 A1* 7/2010 Kusumura ............ G06F 16/258
  707/767
2018/0267947 A1* 9/2018 Miller ................. G06F 16/2477

* cited by examiner

FIG. 5

| STREET OR THE LIKE | CITY NAME | STATE NAME |
|---|---|---|
| 716 GOLDSBOROUGH ST | EASTON | MD |
| 500 CAMDEN AVE | SALISBURY | MD |
| 5333 AUSTIN RD | CAMBRIDGE | MD |
| 201 TWIN OAK DR | PITTSBURGH | PA |
| 427 CAPITOLA RD EXT | SANTA CRUZ | CA |
| 1506 WASHINGTON ST | MICHIGAN CITY | IN |

FIG. 9

| STREET OR THE LIKE | CITY NAME | STATE NAME | CONVERSION EXAMPLE |
|---|---|---|---|
| 716 GOLDSBOROUGH ST | EASTON | MD | Easton, MD |
| 500 CAMDEN AVE | SALISBURY | MD | Salisbury, MD |
| 5333 AUSTIN RD | CAMBRIDGE | MD | |
| 201 TWIN OAK DR | PITTSBURGH | PA | |
| 427 CAPITOLA RD EXT | SANTA CRUZ | CA | |
| 1506 WASHINGTON ST | MICHIGAN CITY | IN | |

EXECUTE

["CopyColumn", {"colIdx": 1}]
["CamelCase", {"colIdx": 3}]
["CopyColumn", {"colIdx": 2}]
["MergeColumnsToOne",{"colIdx0":3, "colIdx1":4, "addChar":","}]

FIG. 12

| STREET OR THE LIKE | CITY NAME | STATE NAME | PREVIOUS CONVERSION RESULT | CONVERSION EXAMPLE |
|---|---|---|---|---|
| 716 GOLDSBOROUGH ST | EASTON | MD | Easton, MD | Easton, MD |
| 500 CAMDEN AVE | SALISBURY | MD | Salisbury,MD | Salisbury,MD |
| 5333 AUSTIN RD | CAMBRIDGE | MD | Cambridge, MD | |
| 201 TWIN OAK DR | PITTSBURGH | PA | Pittsburgh, PA | |
| 427 CAPITOLA RD EXT | SANTA CRUZ | CA | Santa Cruz, CA | Santa Cruz-Watsonville, CA |
| 1506 WASHINGTON ST | MICHIGAN CITY | IN | Michigan City, IN | |

EXECUTE

FIG. 13

```
                 ╱ 52
["CopyColumn", {"colIdx": 1}]
["GetCBSAListByCity", {"colIdx": 3}]
["SelectTopEntity", {"colIdx": 3} ]
```

FIG. 15

| STREET OR THE LIKE | CITY NAME | STATE NAME | PREVIOUS CONVERSION RESULT | CONVERSION EXAMPLE |
|---|---|---|---|---|
| 716 GOLDSBOROUGH ST | EASTON | MD | Easton, MD | Easton, MD |
| 500 CAMDEN AVE | SALISBURY | MD | Salisbury, MD | Salisbury, MD |
| 5333 AUSTIN RD | CAMBRIDGE | MD | Boston-Cambridge-Newton, MA | (Cambridge, MD) |
| 201 TWIN OAK DR | PITTSBURGH | PA | Pittsburgh, PA | |
| 427 CAPITOLA RD EXT | SANTA CRUZ | CA | Santa Cruz-Watsonville, CA | Santa Cruz-Watsonville, CA |
| 1506 WASHINGTON ST | MICHIGAN CITY | IN | Michigan City-La Porte, IN | |

[EXECUTE] — 65c

["CopyColumn", {"colIdx": 1}]
["GetCBSANameByCityAndState", {"colIdx0": 3, "colIdx1": 2}]

| ADDRESS | BUILDING NAME | PHONE NUMBER |
|---|---|---|
| CHIBA MINATO x-x, CHUO-KU, CHIBA CITY, CHIBA | CHIBA CITY OFFICE | 043-245-xxxx |
| TOKIWA x-x-x, URAWA-KU, SAITAMA CITY, SAITAMA | SAITAMA CITY OFFICE | 048-829-xxxx |
| KABUKICHO x-x-x, SHINJUKU-KU, TOKYO | SHINJUKU WARD OFFICE | 03-3209-xxxx |
| OTEMACHI x-x-x, MAEBASHI CITY, GUNMA | MAEBASHI CITY OFFICE | 027-224-xxxx |
| ASAHI x-x-x, UTSUNOMIYA CITY, TOCHIGI | UTSUNOMIYA CITY OFFICE | 028-632-xxxx |
| MINATOCHO x-x, NAKA-KU, YOKOHAMA CITY, KANAGAWA | YOKOHAMA CITY OFFICE | 045-671-xxxx |
| CHUO x-x-x, MITO CITY, IBARAKI | MITO CITY OFFICE | 029-224-xxxx |

FIG. 21

| ADDRESS | BUILDING NAME | PHONE NUMBER | CONVERSION EXAMPLE |
|---|---|---|---|
| CHIBA MINATO x-x, CHUO-KU, CHIBA CITY, CHIBA | CHIBA CITY OFFICE | 043-245-xxxx | CHIBA MINATO x-x, CHUO-KU, CHIBA CITY |
| TOKIWA x-x-x, URAWA-KU, SAITAMA CITY, SAITAMA | SAITAMA CITY OFFICE | 048-829-xxxx | TOKIWA x-x-x, URAWA-KU, SAITAMA CITY |
| KABUKICHO x-x-x, SHINJUKU-KU, TOKYO | SHINJUKU WARD OFFICE | 03-3209-xxxx | |
| OTEMACHI x-x-x, MAEBASHI CITY, GUNMA | MAEBASHI CITY OFFICE | 027-224-xxxx | |
| ASAHI x-x-x, UTSUNOMIYA CITY, TOCHIGI | UTSUNOMIYA CITY OFFICE | 028-632-xxxx | |
| MINATOCHO x-x-x, NAKA-KU, YOKOHAMA CITY, KANAGAWA | YOKOHAMA CITY OFFICE | 045-671-xxxx | |
| CHUO x-x-x, MITO CITY, IBARAKI | MITO CITY OFFICE | 029-224-xxxx | |

91, 91a, 91b, 91c

EXECUTE

["RemoveCharactersFromHead", {"colIdx": 0, "length": 3}]

FIG. 24

| ADDRESS | BUILDING NAME | PHONE NUMBER | PREVIOUS CONVERSION RESULT | CONVERSION EXAMPLE |
|---|---|---|---|---|
| CHIBA MINATO x-x, CHUO-KU, CHIBA CITY, CHIBA | CHIBA CITY OFFICE | 043-245-xxxx | CHIBA MINATO x-x, CHUO-KU, CHIBA CITY | CHIBA MINATO x-x, CHUO-KU, CHIBA CITY |
| TOKIWA x-x-x, URAWA-KU, SAITAMA CITY, SAITAMA | SAITAMA CITY OFFICE | 048-829-xxxx | TOKIWA x-x-x, URAWA-KU, SAITAMA CITY | TOKIWA x-x-x, URAWA-KU, SAITAMA CITY |
| KABUKICHO x-x-x, SHINJUKU-KU, TOKYO | SHINJUKU WARD OFFICE | 03-3209-xxxx | KABUKICHO x-x-x, SHINJUKU-KU | |
| OTEMACHI x-x-x, MAEBASHI CITY, GUNMA | MAEBASHI CITY OFFICE | 027-224-xxxx | OTEMACHI x-x-x, MAEBASHI CITY | |
| ASAHI x-x-x, UTSUNOMIYA CITY, TOCHIGI | UTSUNOMIYA CITY OFFICE | 028-632-xxxx | ASAHI x-x-x, UTSUNOMIYA CITY | |
| MINATOCHO x-x-x, NAKA-KU, YOKOHAMA CITY, KANAGAWA | YOKOHAMA CITY OFFICE | 045-671-xxxx | MINATOCHO x-x, NAKA-KU, YOKOHAMA CITY, KEN | MINATOCHO x-x, NAKA-KU, YOKOHAMA CITY |
| CHUO x-x-x, MITO CITY, IBARAKI | MITO CITY OFFICE | 029-224-xxxx | CHUO x-x-x, MITO CITY | |

EXECUTE

["RemoveCharactersBeforeKey", {"colIdx": 0, "key": "KEN"}]

FIG. 26

| ADDRESS | BUILDING NAME | PHONE NUMBER |
|---|---|---|
| *CHIBA MINATO x-x, CHUO-KU, CHIBA CITY* | CHIBA CITY OFFICE | 043-245-xxxx |
| *TOKIWA x-x-x, URAWA-KU, SAITAMA CITY* | SAITAMA CITY OFFICE | 048-829-xxxx |
| *KABUKICHO x-x-x, SHINJUKU-KU, TOKYO* | SHINJUKU WARD OFFICE | 03-3209-xxxx |
| *OTEMACHI x-x-x, MAEBASHI CITY* | MAEBASHI CITY OFFICE | 027-224-xxxx |
| *ASAHI x-x-x, UTSUNOMIYA CITY* | UTSUNOMIYA CITY OFFICE | 028-632-xxxx |
| *MINATOCHO x-x, NAKA-KU, YOKOHAMA CITY* | YOKOHAMA CITY OFFICE | 045-671-xxxx |
| CHUO x-x-x, MITO CITY | MITO CITY OFFICE | 029-224-xxxx |

APPLIED RECIPE: DELETE CHARACTER STRING UP TO THE LETTER "KEN"   SUCCESS   FAILURE

Color annotations: BLUE (row 1), RED (row 2), BLUE (rows 3-6), BLACK (row 7)

FIG. 27

| ADDRESS | BUILDING NAME | PHONE NUMBER | PREVIOUS CONVERSION RESULT | CONVERSION EXAMPLE |
|---|---|---|---|---|
| CHIBA MINATO x-x, CHUO-KU, CHIBA CITY, CHIBA | CHIBA CITY OFFICE | 043-245-xxxx | CHIBA MINATO x-x-x, CHUO-KU, CHIBA CITY | CHIBA MINATO x-x-x, CHUO-KU, CHIBA CITY |
| TOKIWA x-x-x, URAWA-KU, SAITAMA CITY, SAITAMA | SAITAMA CITY OFFICE | 048-829-xxxx | TOKIWA x-x-x, URAWA-KU, SAITAMA CITY | TOKIWA x-x-x, URAWA-KU, SAITAMA CITY |
| KABUKICHO x-x-x, SHINJUKU-KU, TOKYO | SHINJUKU WARD OFFICE | 03-3209-xxxx | KABUKICHO x-x-x, SHINJUKU-KU, TOKYO | KABUKICHO x-x-x, SHINJUKU-KU |
| OTEMACHI x-x-x, MAEBASHI CITY, GUNMA | MAEBASHI CITY OFFICE | 027-224-xxxx | OTEMACHI x-x-x, MAEBASHI CITY | |
| ASAHI x-x-x, UTSUNOMIYA CITY, TOCHIGI | UTSUNOMIYA CITY OFFICE | 028-632-xxxx | ASAHI x-x-x, UTSUNOMIYA CITY | |
| MINATOCHO x-x-x, NAKA-KU, YOKOHAMA CITY, KANAGAWA | YOKOHAMA CITY OFFICE | 045-671-xxxx | MINATOCHO x-x-x, NAKA-KU, YOKOHAMA CITY | MINATOCHO x-x-x, NAKA-KU, YOKOHAMA CITY |
| CHUO x-x-x, MITO CITY, IBARAKI | MITO CITY OFFICE | 029-224-xxxx | CHUO x-x-x, MITO CITY | |

EXECUTE

["RemovePrefectures", {"colIdx": 0}]

COMPUTER-READABLE RECORDING MEDIUM FOR STORING DATA PROCESSING PROGRAM, DATA PROCESSING METHOD, AND DATA PROCESSING APPARATUS

CROSS-REFERENCE TO RELATED APPLICATION

This application is based upon and claims the benefit of priority of the prior Japanese Patent Application No. 2020-137907, filed on Aug. 18, 2020, the entire contents of which are incorporated herein by reference.

FIELD

The embodiments discussed herein are related to a non-transitory computer-readable storage medium storing a data processing program, a data processing method, and a data processing apparatus.

BACKGROUND

In the field of data processing, mainly in the fields of statistical analysis and data science, tabular data may be organized according to the purpose of use. As a technique for organizing tabular data, there is a technique called programming by example (PBE). Tabular data is, for example, a data table including a plurality of records.

PBE is a technique of inputting, to a computer, conversion examples for some records registered in a data table, thereby causing the computer to automatically execute data conversion of other records in accordance with the conversion examples. In this case, the computer to which the conversion examples are given detects a difference between values in a record before and after conversion, and generates a conversion rule (hereinafter, referred to as a recipe) for performing conversion corresponding to the difference. For example, a recipe is expressed by a combination of operators indicating the operation of a value in a record. For example, an operator is a function including one or more instructions.

As a technique related to data conversion, for example, an information processing method that enables verification of correctness of a conversion rule of structured data has been proposed. There has also been proposed a data converter that combines data conversion processing based on a conversion rule and data conversion processing based on inference.

Examples of the related art include Japanese Laid-open Patent Publication No. 2008-108144 and Japanese Laid-open Patent Publication No. 11-53360.

The conversion accuracy of a recipe in PBE depends on conversion examples to be input. For this reason, a user repeats trial and error of inputting conversion examples and generating a recipe to increase the accuracy of conversion by a recipe. In this case, every time a recipe is generated, the user causes a computer to execute conversion of records in a data table to which the recipe is applied. The user causes the computer to display the application result, and visually checks whether there is a record for which conversion against the user's intention has been performed. In such visual checking of conversion results, when there is a large number of records, an oversight of conversion against the user's intention is likely to occur. When an incorrect conversion result is overlooked in the process of generating a recipe, only a recipe with low accuracy of conversion (frequent occurrence of conversion against the user's intention) may be obtained.

In one aspect of the embodiments disclosed below, there is provided a solution to suppress the occurrence of conversion against a user's intention.

SUMMARY

According to an aspect of the embodiments, provided is a non-transitory computer-readable storage medium for storing data processing program which causes a processor to perform processing. In an example, the processing includes: repeatedly executing a first processing configured to generate, in response to input of conversion examples of values set in some records of a plurality of records, a conversion program for converting values of the plurality of records, convert values of the plurality of records by executing the generated conversion program, and display a conversion result of the conversion program; and executing a second processing configured to select one or more second records from among the plurality of records, each of the one or more records being a record on an upper side of a first record, the first record being a record for which a conversion example is added in second or subsequent input of conversion examples during the repeatedly executing of the first processing, determine whether a value of each of the one or more second records is changed in a latest conversion result from a previous conversion result, and in response that a value of the second record is changed, cause the first processing to highlight a value of the second record in display of the latest conversion result.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of a data table;

FIG. 9 illustrates an example of a conversion example input screen for the first input of conversion examples;

FIG. 10 illustrates an example of a recipe generated by the first recipe generation;

FIG. 12 illustrates an example of the second conversion example input screen;

FIG. 13 illustrates an example of a recipe generated by the second recipe generation;

FIG. 15 illustrates an example of the third conversion example input screen;

FIG. 16 illustrates an example of a recipe generated by the third recipe generation;

FIG. 18 illustrates an example of a data table in which Japanese character strings are set;

FIG. 21 illustrates an example of a conversion example input screen for the first input of Japanese conversion examples;

FIG. 22 illustrates an example of a recipe for Japanese conversion generated by the first recipe generation;

FIG. 24 illustrates an example of the second Japanese conversion example input screen;

FIG. 25 illustrates an example of a recipe for Japanese conversion generated by the second recipe generation;

FIG. 26 illustrates an example of a conversion result check screen in the second Japanese conversion;

FIG. 27 illustrates an example of the third Japanese conversion example input screen;

FIG. 28 illustrates an example of a recipe for Japanese conversion generated by the third recipe generation.

DESCRIPTION OF EMBODIMENT(S)

Hereinafter, the embodiments will be described with reference to the drawings. Each of the embodiments may be implemented by combining a plurality of embodiments in a range not causing any contradiction.

First Embodiment

First, a first embodiment will be described.

Figure 1:
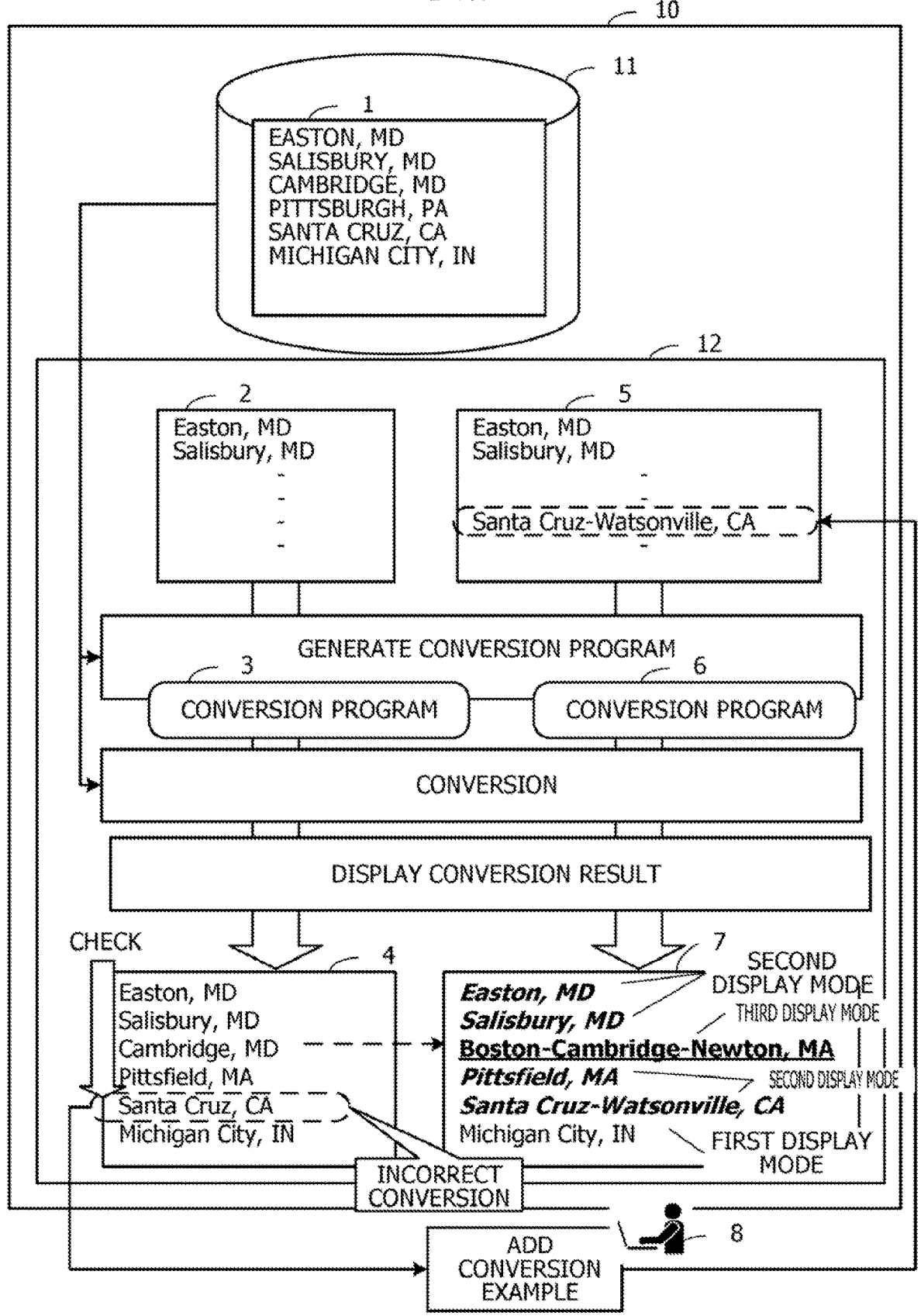
FIG. 1 illustrates an example of a data processing method according to a first embodiment.

FIG. 1 illustrates an example of a data processing method according to the first embodiment. In FIG. 1, a data processing apparatus 10 for realizing a data processing method is illustrated. The data processing apparatus 10 may realize a data processing method, for example, by executing a data processing program.

The data processing apparatus 10 includes a storage unit 11 and a processing unit 12. The storage unit 11 is, for example, a memory or a storage device included in the data processing apparatus 10. The processing unit 12 is, for example, a processor or an arithmetic circuit included in the data processing apparatus 10.

The storage unit 11 stores tabular data 1 in which a plurality of records are registered.

The processing unit 12 generates conversion programs 3 and 6 for converting values of a plurality of records in response to input of conversion examples for values set in some records among the plurality of records. The processing unit 12 executes conversion of the values of the plurality of records by executing the generated conversion program 3 and 6. The processing unit 12 displays, on a monitor or the like, conversion results 4 and 7 obtained by converting the values of the plurality of records. The processing unit 12 repeatedly executes the generation processing of the conversion programs 3 and 6, the conversion processing by the conversion programs 3 and 6, and the display processing of the conversion results 4 and 7, for each input of conversion examples.

Each time when second or subsequent conversion processing is performed, the processing unit 12 determines whether the value of each of one or more second records on the upper side of a first record for which a conversion example is added in second or subsequent input of conversion examples is changed in the latest conversion result 7 from the previous conversion result 4. For example, a record displayed at an upper position is an upper record. When records are sorted in accordance with a predetermined rule and displayed in the sorted order, a record in an upper row after the sorting is an upper record. When the value of a second record is changed, the processing unit 12 causes the value of the second record to be highlighted in the display of the latest conversion result 7.

The second record is a record for which the user has checked the conversion result, and is hereinafter also referred to as a checked record. The first record for which a conversion example is added may be included in the second record.

A user 8 may perform data conversion by PBE by using the described data processing apparatus 10. For example, the user 8 operates an input device such as a keyboard to input a first conversion example to the data processing apparatus 10. The processing unit 12 generates a conversion example list 2 including the input conversion example. In the conversion example list 2, converted values of the top two records in the data 1 are specified.

When the conversion example list 2 indicating conversion examples is input, the processing unit 12 generates the conversion program 3 that may perform the same conversion as the conversion examples indicated in the conversion example list 2. Next, the processing unit 12 executes the conversion program 3 on a plurality of records in the data 1 to convert the values of the plurality of records. The processing unit 12 displays the conversion result 4 on a monitor.

The user 8 sequentially checks, from the top, whether the values of the records indicated in the displayed conversion result 4 are converted as intended. When the user 8 finds an incorrectly converted value, the user inputs, to the data processing apparatus 10, a conversion example specifying the converted value of the record as intended. For example, a new conversion example list 5 is generated by adding the input conversion example to the conversion example list 2. In the conversion example list 5, a conversion example for the fifth record is added.

The processing unit 12 generates the conversion program 6 that may perform the same conversion as the conversion example in the conversion example list 5. Next, the processing unit 12 executes the conversion program 6 on the plurality of records in the data 1 to convert the values of the plurality of records. The processing unit 12 displays the conversion result 7 on a monitor.

When displaying the conversion result 7, the processing unit 12 sets the record for which a conversion example is added (in the example of FIG. 1, the fifth record) as a first record. The processing unit 12 sets one or more records (in the example of FIG. 1, first to fourth records) on the upper side of the first record as second records. The processing unit 12 determines whether the value of each of the second records is changed in the latest conversion result 7 from the previous conversion result 4. In the example of FIG. 1, the value of the third record indicated in the conversion result 7 is changed from the value of the corresponding record indicated in the conversion result 4. In this case, in the display of the latest conversion result 7, the processing unit 12 causes the value of the second record (third record from the top), of which the value has been changed, to be highlighted. In the example of FIG. 1, the value of the third record is highlighted by underlining the value, but the processing unit 12 may display the value of the record in a highlighted color.

As described above, the value of a second record is highlighted when the value indicated in the latest conversion result 7 is a changed value of the value indicated in the previous conversion result 4. The second records are records on the upper side of the record for which a conversion example is added. Since the user 8 has checked the conversion result 4 from the top, the second records are records for which it is checked that the value has been correctly converted as intended. Therefore, if a converted value of a second record is changed by updating conversion examples, the value is converted from a correct value to an incorrect value. For example, the data processing apparatus 10 may call the user 8's attention to the fact that the value of a record for which it is checked that the value has been correctly converted is changed to an incorrect value, by highlighting the value.

The user 8 inputs a conversion example for correcting the highlighted value, thereby improving the accuracy of conversion by conversion programs to be generated after the input. As a result, the occurrence of conversion against the user's intention is suppressed. In addition, since an incorrectly converted value is highlighted, the load of checking whether conversion has been correctly performed is reduced.

When the update of conversion examples is repeated, a plurality of first records are generated. In a case where there are a plurality of first records, for example, the processing unit 12 sets records on the upper side of the lowest first record that is lowest among the plurality of first records, as second records. Thus, a record for which conversion result has been checked at least once is a second record. As a result, records for which conversion result has been checked may be correctly extracted.

In a case where the latest first record for which a conversion example is added in the last input of conversion examples among the plurality of first records is on the upper side of the lowest first record, the processing unit 12 may exclude the value of the latest first record, which is also the second record, from a target to be highlighted. The record for which a conversion example is added in the last input of conversion examples is a record in which the previous conversion result was incorrect. A conversion example is added so that the value of the record in which the previous conversion result was incorrect is correctly converted, and it is expected that the value indicated in the current conversion result 7 is a correct value. By suppressing that this value is highlighted, it is possible to highlight only the value of a record in which conversion against the user 8's intention has been performed.

There may be a case where some of the records for which a conversion example is specified (including a record for which a conversion example is specified in the first conversion processing and a first record for which a conversion example is specified in the second or subsequent conversion processing) may not be converted as in the conversion example. This may occur in a case where an error exists in part of the input conversion example or in a case where the algorithm to generate the conversion programs 3 and 6 does not adequately support the conversion example. The processing unit 12 may highlight the value of a record for which a conversion example is specified when the converted value is different from the specified conversion example. Accordingly, in a case where the value of a record for which a conversion example is specified is converted into a value different from the conversion example, it is possible to notify the user 8 that the conversion is not performed as in the conversion example.

The processing unit 12 may display the conversion result 7 by distinguishing the second record for which the user 8 has checked the conversion result at least once from the other records. For example, the processing unit 12 causes the value of a record lower than the first record to be displayed in a first display mode. The processing unit 12 causes the value of an unchanged second record, among the second records, that is not changed in the latest conversion result 7 from a value of the previous conversion result 4, to be displayed in a second display mode different from the first display mode. The processing unit 12 causes the value of a changed second record, among the second records, that is changed in the latest conversion result 7 from the previous conversion result 4, to be displayed in a third display mode different the first display mode and the second display mode. Thus, the user 8 may easily see the records that has been checked.

The processing unit 12 displays the value of a record for which a conversion example is specified in the second display mode, for example, when the specified conversion example matches the conversion result. The processing unit 12 displays the value of a record for which a conversion example is specified in the third display mode, for example, when the specified conversion example does not match the conversion result.

In the example of FIG. 1, the first display mode is a mode in which letters are written in a thin font, the second display mode is a mode in which letters are written in a bold and italic font, and the third display mode is a mode in which letters are written in a bold font with an underline. The processing unit 12 may distinguish the display modes by colors. For example, the processing unit 12 may set the first display mode as a mode in which letters are written in a black font, the second display mode as a mode in which letters are written in a blue font, and the third display mode as a mode in which letters are written in a red font.

Second Embodiment

Next, a second embodiment will be described. In the second embodiment, a data format is converted according to the use of a user based on tabular data stored in a database on a server.

Figure 2:
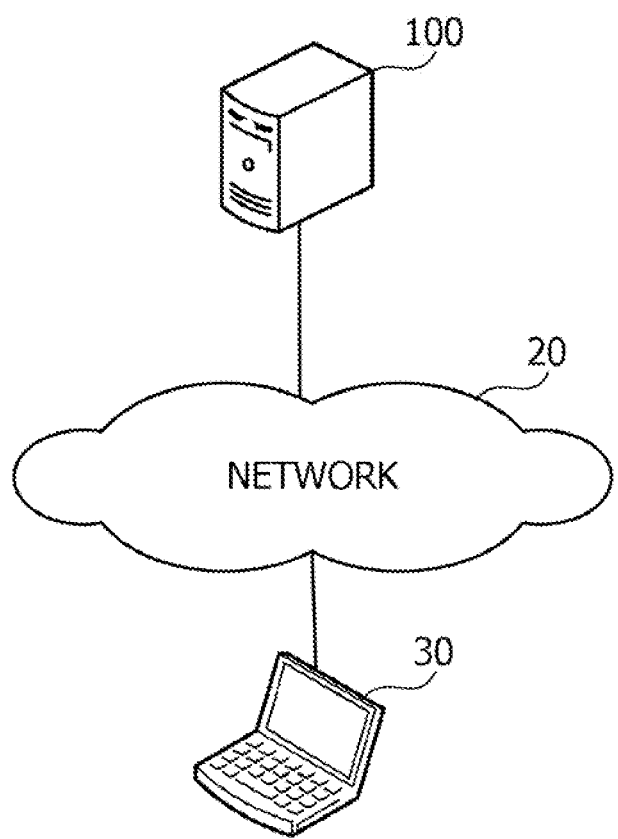
FIG. 2 illustrates an example of a system configuration.

FIG. 2 illustrates an example of a system configuration. A server 100 and a terminal device 30 are coupled to each other via a network 20. The server 100 is a computer that manages tabular data. The terminal device 30 is a computer used by a user who intends to convert a data format. The server 100 is an example of the data processing apparatus 10 described in the first embodiment.

Figure 3:
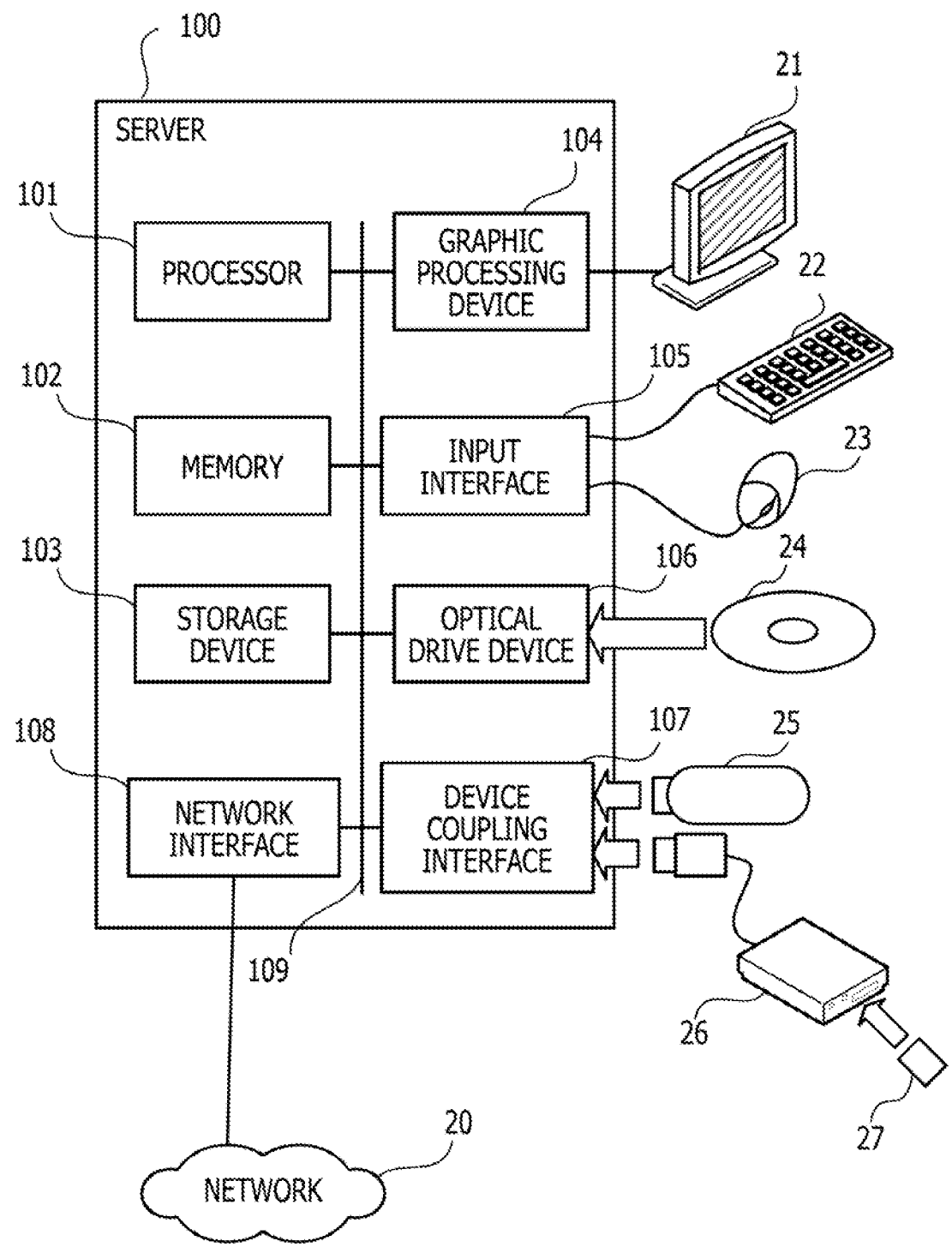
FIG. 3 illustrates an example of hardware of a server.

FIG. 3 illustrates an example of hardware of the server. The server 100 is entirely controlled by a processor 101. A memory 102 and a plurality of peripheral devices are coupled to the processor 101 via a bus 109. The processor 101 may be a multiprocessor. The processor 101 is, for example, a central processing unit (CPU), a microprocessor unit (MPU), or a digital signal processor (DSP). At least a part of functions realized by the processor 101 executing a program may be realized by an electronic circuit such as an application-specific integrated circuit (ASIC) or a programmable logic device (PLD).

The memory 102 is used as a main storage device of the server 100. The memory 102 temporarily stores at least some of programs of an operating system (OS) and application programs to be executed by the processor 101. The memory 102 stores various pieces of data to be used in processing performed by the processor 101. As the memory 102, for example, a volatile semiconductor storage device such as a random-access memory (RAM) is used.

The peripheral devices coupled to the bus 109 include a storage device 103, a graphic processing device 104, an input interface 105, an optical drive device 106, a device coupling interface 107, and a network interface 108.

The storage device 103 electrically or magnetically writes and reads data to and from a recording medium built therein. The storage device 103 is used as an auxiliary storage device of a computer. The storage device 103 stores the programs of the OS, the application programs, and the various pieces of data. As the storage device 103, for example, a hard disk drive (HDD) or a solid-state drive (SSD) may be used.

A monitor 21 is coupled to the graphic processing device 104. The graphic processing device 104 causes an image to be displayed on a screen of the monitor 21 in accordance with an instruction from the processor 101. Examples of the monitor 21 include a display device using organic electroluminescence (EL), a liquid crystal display device, and the like.

A keyboard 22 and a mouse 23 are coupled to the input interface 105. The input interface 105 transmits, to the processor 101, signals transmitted from the keyboard 22 and the mouse 23. The mouse 23 is an example of a pointing device, and other pointing devices may also be used. The other pointing devices may be a touch panel, a tablet, a touch pad, a trackball, or the like.

The optical drive device 106 reads data recorded on an optical disc 24 or writes data to the optical disc 24 by using a laser beam or the like. The optical disc 24 is a portable recording medium on which data is recorded such that the data is readable through reflection of light. The optical disc 24 may be a Digital Versatile Disc (DVD), a DVD-RAM, a compact disc read-only memory (CD-ROM), a CD-recordable (CD-R), a CD-rewritable (CD-RW), or the like.

The device coupling interface 107 is a communication interface for coupling a peripheral device to the server 100. For example, a memory device 25 and a memory reader/writer 26 may be coupled to the device coupling interface 107. The memory device 25 is a recording medium having a function of communicating with the device coupling interface 107. The memory reader/writer 26 is a device that writes data to a memory card 27 or reads data from the memory card 27. The memory card 27 is a card-type recording medium.

The network interface 108 is coupled to the network 20. The network interface 108 transmits and receives data to and from another computer or a communication device via the network 20. The network interface 108 is, for example, a wired communication interface that is coupled to a wired communication device such as a switch or a router by a cable. The network interface 108 may be a wireless communication interface that is wirelessly coupled to and communicates with a wireless communication device such as a base station or an access point by radio.

With the hardware described above, the server 100 may realize processing functions of the second embodiment. The data processing apparatus device 10 described in the first embodiment may also be realized by the same hardware as the server 100 illustrated in FIG. 3.

For example, the server 100 realizes the processing functions of the second embodiment by executing a program recorded in a computer-readable recording medium. A program in which details of processing to be executed by the server 100 is written may be recorded in various recording media. For example, a program to be executed by the server 100 may be stored in the storage device 103. The processor 101 loads at least a part of the program in the storage device 103 to the memory 102 and executes the program. The program to be executed by the server 100 may also be recorded in a portable recording medium such as the optical disc 24, the memory device 25, or the memory card 27. The program stored in the portable recording medium may be executed after being installed in the storage device 103 under the control of the processor 101, for example. The processor 101 may read the program directly from the portable recording medium and execute the program.

A user may use the terminal device 30 to access the server 100, and cause the server 100 to generate a recipe for converting a data table stored in the server 100. The server 100 generates a recipe in accordance with a conversion example input via the terminal device 30, and converts the values of the records in the data table by using the recipe. A recipe is an example of the conversion program described in the first embodiment.

Figure 4:
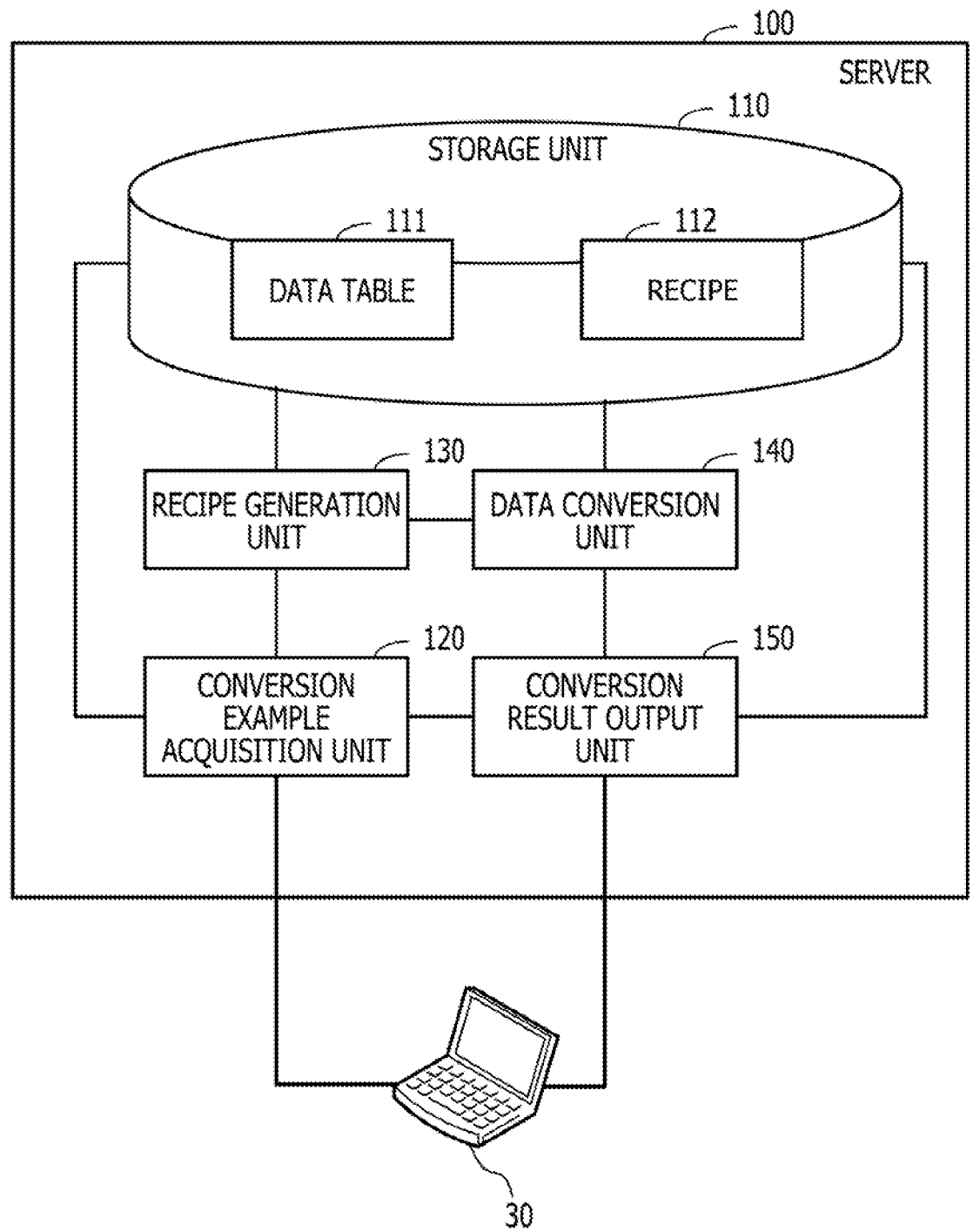
FIG. 4 is a block diagram illustrating an example of functions of the server.

FIG. 4 is a block diagram illustrating an example of functions of the server. The server 100 includes a storage unit 110, a conversion example acquisition unit 120, a recipe generation unit 130, a data conversion unit 140, and a conversion result output unit 150.

The storage unit 110 stores a data table 111 and a recipe 112. The data table 111 is tabular data in which a plurality of records are registered. The recipe 112 is information indicating a conversion rule for converting the data table 111. The storage unit 110 is, for example, a part of a storage area of the memory 102 or the storage device 103 included in the server 100.

The conversion example acquisition unit 120 acquires a conversion example of a value in a record from the terminal device 30. For example, the conversion example acquisition unit 120 transmits screen data of a conversion example input screen to the terminal device 30. The terminal device 30 displays the conversion example input screen. When a user inputs conversion examples of values of some records to the conversion example input screen, information (for example, a conversion example list) indicating the input conversion examples is transmitted from the terminal device 30 to the server 100. When acquiring the conversion example list from the terminal device 30, the conversion example acquisition unit 120 transmits the information to the recipe generation unit 130.

The recipe generation unit 130 generates the recipe 112 for converting values of records in the data table 111 based on the conversion example list transmitted from the conversion example acquisition unit 120. The recipe generation unit 130 stores the generated recipe 112 in the storage unit 110.

The data conversion unit 140 uses the recipe 112 to convert values of records in the data table 111, and generates a new data table including the converted values. The data conversion unit 140 transmits the data table generated as a conversion result to the conversion result output unit 150.

The conversion result output unit 150 outputs the conversion result. For example, the conversion result output unit 150 generates screen data of a conversion result check screen including the data table obtained as the conversion result. When recipes are repeatedly generated, the conversion result output unit 150 generates screen data of highlighting a record on which conversion different from the conversion result by a previously generated recipe is performed, among records for which it has been checked whether conversion is correct in the past. The conversion result output unit 150 transmits the screen data of the conversion result check screen to the terminal device 30.

For example, the function of each element illustrated in FIG. 4 may be realized by causing a computer to execute a program module corresponding to the element.

Next, an example of the original data table 111 to be converted will be described.

FIG. 5 illustrates an example of a data table. The data table 111 illustrated in FIG. 5 includes columns for street or the like, city name, and state name. A record in the data table 111 includes a field corresponding to each column. The name of a street or the like is set in the street or the like column. The name of the city including the corresponding street is set in the city name column. The name of the state including the corresponding city is set in the state name column. In the example of FIG. 5, the name of a state is represented by an abbreviation.

A user may cause the server 100 to generate another data table by PBE, using the data table 111 illustrated in FIG. 5 as an original data table to be converted. At this time, the user visually checks the application result of a recipe. For example, when the number of records is large, the user uses page switching, vertical scrolling, or the like to display records to be checked on a screen, and visually checks whether the conversion result is as intended by the user.

Figure 6:
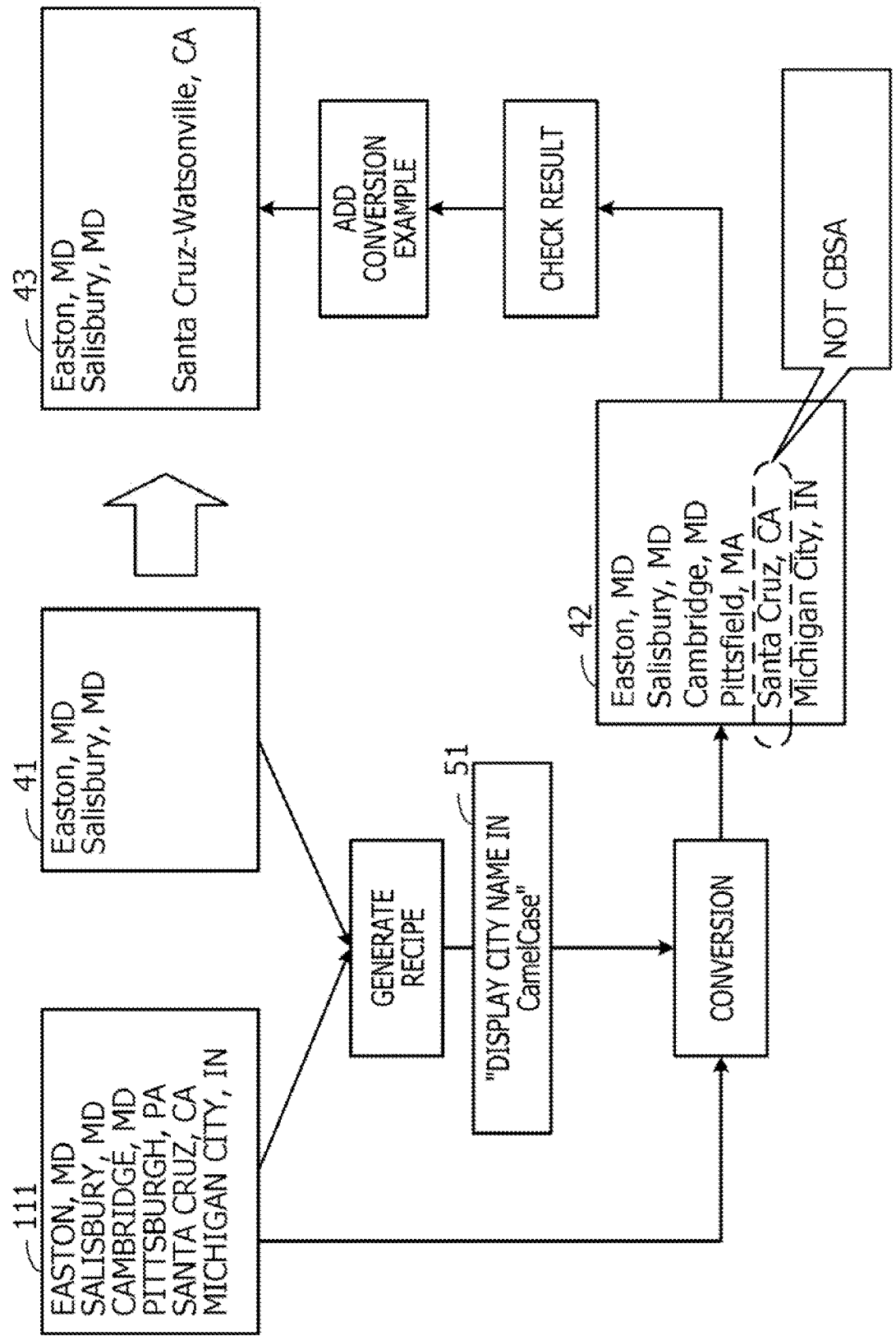
FIG. 6 illustrates an example of checking a data table conversion result.

FIG. 6 illustrates an example of checking a data table conversion result. FIG. 6 illustrates an example in which different names are generated based on a city name and a state name. For example, it is assumed that the user inputs, to a conversion example list 41, "Easton, MD" as the value converted from "EASTON, MD" and "Salisbury, MD" as the value converted from "SALISBURY, MD", as conversion examples. The recipe generation unit 130 of the server 100 generates a recipe for converting the value of each record in the data table 111 in accordance with the conversion examples indicated in the conversion example list 41. For example, it is assumed that a conversion rule of "display a city name in CamelCase" is generated as a recipe 51. "CamelCase" is a form in which the first letter of each word in a compound word is written in upper case.

When the recipe 51 is generated, the data conversion unit 140 converts the city names in the data table 111 in accordance with the recipe 51. A new data table 42 is generated as a conversion result. The data table 42 as the conversion result is transmitted to the terminal device 30 by the conversion result output unit 150 and displayed on the screen of the terminal device 30.

The user checks the conversion result based on the data table 42 displayed on the terminal device 30. For example, the user checks the correctness of the conversion results sequentially from the top record of the data table 42. When the user finds an incorrectly converted record, it may be determined that the conversion by the current recipe is inaccurate. Thus, the user adds a correct conversion result of the incorrectly converted record as a conversion example without checking records lower than the incorrectly converted record, and instructs the server 100 to regenerate a recipe.

It is assumed that the conversion intended by the user is conversion from a city name including a street or the like to a core based statistical area (CBSA) including the street or the like. A CBSA is a statistical area in which neighboring cities and towns are organized such that the number of people in each area is substantially the same. In the example of FIG. 6, "Santa Cruz, CA" included in the data table 42 is not a CBSA. In this case, the user adds the CBSA corresponding to "SANTA CRUZ, CA" to a conversion example list 43 as a conversion example.

By repeating addition of a conversion example, generation of a recipe, and checking of a result of conversion by the generated recipe as described above, a recipe for performing correct conversion may be generated. In this case, in order to improve the accuracy of conversion by a recipe, it is important to suppress an oversight of an incorrectly converted record in checking conversion results. For example, a user who is repeatedly checking conversion results repeatedly checks the records checked in previous conversions. When checking the records checked in previous conversions, the checking tends to be aimless and careless. For example, there is a high possibility of an oversight of an incorrectly converted record for the records checked in previous conversions.

In a processing system that repeatedly generates recipes for data conversion, in order to reduce a user's burden due to visual checking, when a conversion result of a record for which conversion result has been checked before is changed by the latest recipe, the server 100 highlights the record. Thus, the user may easily recognize that there is a possibility that an originally correct record has turned into an incorrect record due to a change in conversion result by repeating generation of recipes, and may carefully check the record. As a result, an oversight of incorrect conversion may be reduced.

Next, a procedure of data table conversion processing in the server 100 will be described.

Figure 7:
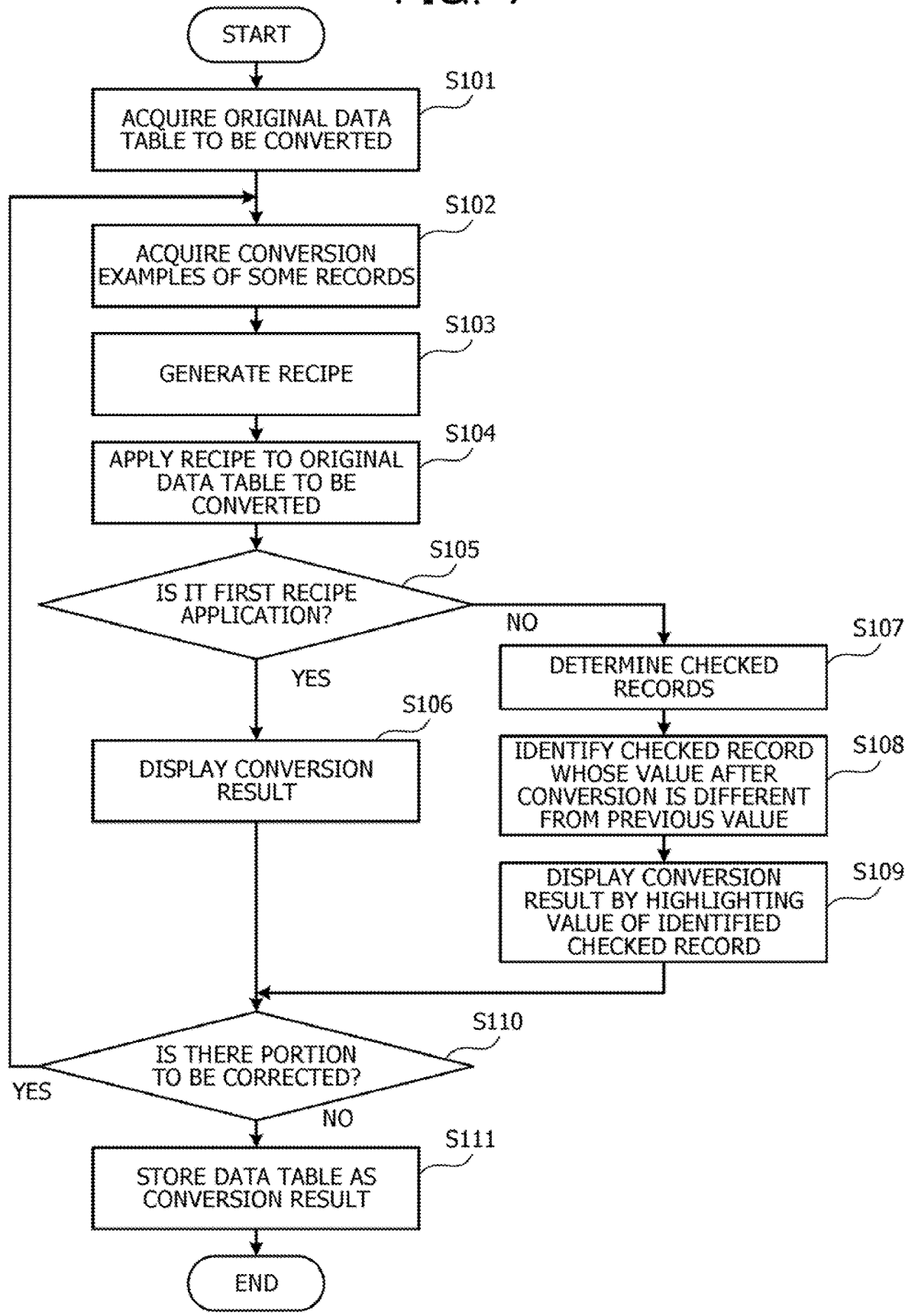
FIG. 7 is a flowchart illustrating an example of a procedure of data table conversion processing.

FIG. 7 is a flowchart illustrating an example of a procedure of data table conversion processing. Hereinafter, the processing illustrated in FIG. 7 will be described by following step numbers.

[Step S101] The conversion example acquisition unit 120 acquires, from the storage unit 110, the original data table 111 to be converted.

[Step S102] The conversion example acquisition unit 120 acquires conversion examples of values of some records among records included in the data table 111. For example, the conversion example acquisition unit 120 transmits screen data of a conversion example input screen to the terminal device 30. When a user inputs conversion examples of values of some records to the conversion example input screen using the terminal device 30, a conversion example list including the input conversion examples is transmitted from the terminal device 30 to the server 100. The conversion example acquisition unit 120 receives the conversion example list transmitted from the terminal device 30, and acquires the conversion examples indicated in the information.

[Step S103] The recipe generation unit 130 generates the recipe 112 based on the conversion examples acquired by the conversion example acquisition unit 120. For example, the recipe generation unit 130 combines operators (instructions for operation of values in records) prepared in advance, and generates a program for performing conversion in accordance with the conversion examples. The generated program is the recipe 112.

[Step S104] The data conversion unit 140 applies the recipe 112 to the original data table 111 to be converted. For example, the data conversion unit 140 executes the operators indicated in the recipe 112 for all records in the data table 111 in the order indicated in the recipe 112. The data conversion unit 140 generates a data table including records whose values have been changed by application of the recipe, and outputs the data table as a conversion result.

[Step S105] The conversion result output unit 150 determines whether the application of a recipe executed in the immediately preceding step S104 is the first application of a recipe. When the application of a recipe is the first application, the conversion result output unit 150 causes the processing to proceed to Step S106. When the application of a recipe is the second or subsequent application, the conversion result output unit 150 causes the processing to proceed to Step S107.

[Step S106] The conversion result output unit 150 causes the terminal device 30 to display the data table generated as a conversion result. For example, the conversion result output unit 150 generates screen data indicating a conversion result check screen including the generated data table, and transmits the screen data to the terminal device 30. The terminal device 30 displays the conversion result check screen on the monitor. After that, the conversion result output unit 150 causes the processing to proceed to Step S110.

[Step S107] The conversion result output unit 150 determines, among records included in the data table generated as a conversion result, checked records for which the user has checked the conversion result at least once. For example, the conversion result output unit 150 identifies the lowest record among records in the data table for which conversion examples are set. The conversion result output unit 150 sets the identified record and records on the upper side of the identified record as checked records.

[Step S108] The conversion result output unit 150 identifies checked records in which the value after conversion in previous application of a recipe is different from the value after conversion in the current application of a recipe. The conversion result output unit 150 excludes, from the identification target, a record for which a conversion example is added for the current generation of a recipe.

For example, for each checked record in the data table generated by the current application of a recipe, the conversion result output unit 150 compares the set value with a corresponding record in the data table generated by the previous application of a recipe. The conversion result output unit 150 identifies, as checked records, records in which the set value is at least partially different from the previous value and for which a conversion example is not additionally set for the current generation of a recipe.

[Step S109] The conversion result output unit 150 highlights the value of the identified checked record, and causes the terminal device 30 to display the data table generated as a conversion result. For example, the conversion result output unit 150 generates screen data indicating a conversion result check screen that includes the generated data table and in which the display color of the value of the identified checked record is different from the display color of the other records. The conversion result output unit 150 transmits the generated screen data to the terminal device 30. The terminal device 30 displays, on the monitor, the conversion result check screen in which the identified checked records are highlighted.

[Step S110] The conversion result output unit 150 determines whether there is a portion to be corrected. For example, when receiving information indicating that the conversion for any record has failed from the terminal device 30, the conversion result output unit 150 determines that there is a portion to be corrected. When there is a portion to be corrected, the conversion result output unit 150 causes the processing to proceed to step S102. When there is no portion to be corrected, the conversion result output unit 150 causes the processing to proceed to step S111.

[Step S111] The conversion result output unit 150 stores, in the storage unit 110, the data table generated as a conversion result in the last conversion. The conversion result output unit 150 stores the recipe used in the last conversion in the storage unit 110.

In this way, addition of a conversion example, generation of a recipe, and conversion of a data table are repeated until there is no more portion to be corrected. Whether there is a portion to be corrected is determined based on a result of checking the conversion result check screen by a user. In the conversion result check screen, the value of the checked record whose value after conversion is different from the previous value is highlighted. Therefore, in a case where an incorrect conversion result is obtained with a new recipe for a record for which a conversion result has been checked to be correct before, it may be suppressed that a user overlooks the record.

Figure 8:
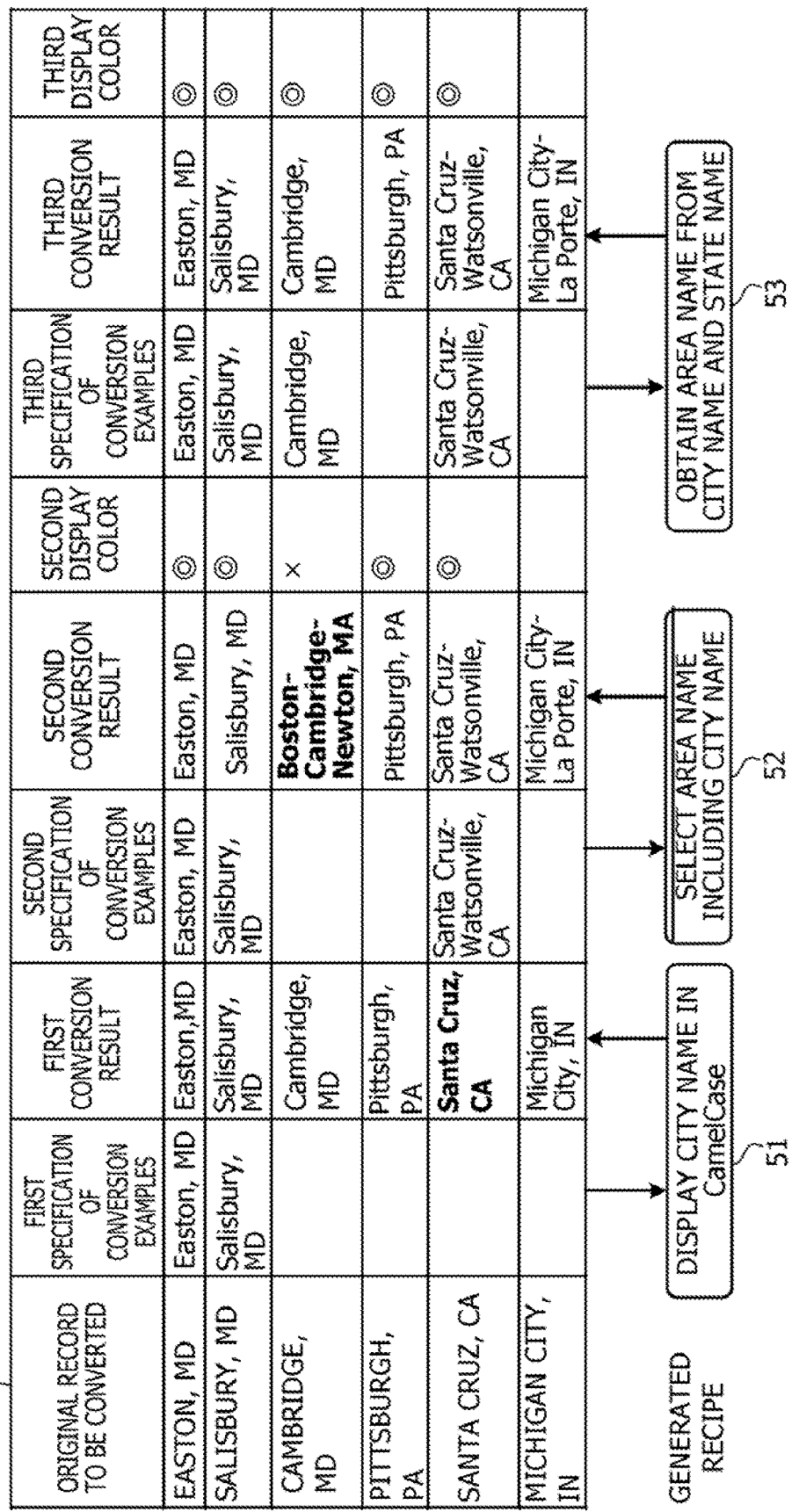
FIG. 8 illustrates an example of a conversion history of records in a data table obtained by repeating conversion.

FIG. 8 illustrates an example of a conversion history of records in a data table obtained by repeating conversion. In a conversion history 50, conversion examples and conversion results, which are obtained by applying recipes 51 to 53 generated based on the conversion examples, are indicated in association with original records to be converted. In the example illustrated in FIG. 8, three recipes 51 to 53 are generated by specifying conversion examples three times. It is assumed that the conversion intended by a user is conversion from a city name and a state name to an area name of CBSA.

In the first specification of conversion examples, a conversion example of converting "EASTON, MD" into "Easton, MD" and a conversion example of converting "SALISBURY, MD" into "Salisbury, MD" are specified. In the example of FIG. 8, the recipe 51 in which an operator of "display city name in CamelCase" is described is generated based on the two conversion examples.

By applying the recipe 51 to convert the value of each record, the records for which a conversion example is specified are converted as in the conversion example. When the user checks the conversion results sequentially from the top record, the user notices that the fifth record is converted incorrectly. The fifth record is converted from "SANTA CRUZ, CA" to "Santa Cruz, CA". However, "Santa Cruz, CA" is not an area name of CBSA.

The user additionally specifies a conversion example "Santa Cruz-Watsonville, CA" for the fifth record. In the example of FIG. 8, the recipe 52 in which an operator of "select area name including city name" is described is generated based on the second specification of conversion examples.

By applying the recipe 52 to convert the value of each record, the records for which a conversion example is specified are converted as in the conversion example. Records from the first record to the fifth record, for which a conversion example is additionally specified, are checked records for which the user has checked the previous conversion result. The value of the third record among the checked records is converted into a value different from that in the previous conversion. Since the conversion result determined to be correct in the previous conversion is changed to a different conversion result, there is a high possibility that the second conversion result for this record is incorrect.

Although the value of the fifth record is converted into a value different from that in the previous conversion, this record is a record for which a conversion example is specified, and is a record in which the previous conversion result was incorrect. The fifth record is converted as in the conversion example, and the second conversion result is correct.

For example, the conversion result output unit 150 highlights the checked records in which the conversion result has been changed from the previous conversion result (changed second record in the first embodiment) by displaying the checked records in red. This may suppress an oversight of incorrect conversion for the third record when the user performs checking. The record for which a conversion example is currently added is excluded from the target to be highlighted.

For example, the conversion result output unit 150 displays the checked records in which the conversion result has not been changed from the previous conversion result (unchanged second record in the first embodiment) in a color different from the color (for example, black) of the other records by displaying the checked records in blue. Thus, the user may recognize checked records, and may easily identify records for which it has already been checked that conversion is correct and in which the same conversion result is obtained in the second conversion.

When the user finds that the conversion result is incorrect for the third record, the user additionally specifies a conversion example "Cambridge, MD" for the record. In the example of FIG. 8, the recipe 53 in which an operator of "obtain area name from city name and state name" is described is generated based on the third specification of conversion examples.

By applying the recipe 53 to convert the value of each record, the records for which a conversion example is specified are converted as in the conversion example. Records from the first record to the fifth record, for which a conversion example has been additionally specified in the past, are checked records for which the user has checked previous conversion results. The value of the third record among the checked records is converted into a value different from that in the previous conversion, but this is a record for which a conversion example is additionally specified. The conversion result output unit 150 displays the checked record in a color different from the color (for example, black) of the other records by displaying the checked record in blue.

As described above, by sequentially adding conversion examples for incorrectly converted records, the recipe 53 that enables correct conversion is generated. By applying the recipe 53 to convert the data table 111, conversion may be performed as intended by the user for all records in the data table 111.

Hereinafter, with reference to FIGS. 9 to 17, detailed description will be given for user operation and recipes to be generated in conversion processing of the data table 111 by PBE as illustrated in FIG. 8. In the following example, the data table 111 is input (column 0: street or the like, column 1: city name, column 2: state name), and a data table obtained by adding a column of CBSA (area name) to the data table 111 is output (column 0: street or the like, column 1: city name, column 2: state name, column 3: CBSA (area name)).

For example, a user operates the terminal device 30 to instruct the server 100 to generate a data table of "column 0: street or the like, column 1: city name, column 2: state name, column 3: CBSA (area name)" based on the data table 111.

The conversion example acquisition unit 120 of the server 100 generates screen data of a conversion example input screen based on the data table 111, and transmits the screen data to the terminal device 30. The conversion example input screen is displayed on the terminal device 30.

FIG. 9 illustrates an example of a conversion example input screen for the first input of conversion examples. A conversion example input screen 61 includes a data table display section 61*a*, a conversion example input section 61*b*, and a button 61*c*. The data table display section 61*a* displays the values set in the fields of the records registered in the original data table 111 to be converted.

The conversion example input section 61*b* is an area for inputting conversion examples. The conversion example input section 61*b* includes text boxes for inputting conversion examples in association with the records. The button 61*c* is a button for instructing to execute conversion of the data table 111 based on conversion examples.

The user inputs a conversion example for the corresponding record to any one or more text boxes of the conversion example input section 61*b*. In the example of FIG. 9, a conversion example is input for the first and second records. Next, the user presses the button 61*c*.

When the button 61*c* is pressed, a conversion example list including the conversion examples input to the conversion example input section 61*b* is transmitted from the terminal device 30 to the server 100. In the server 100 having received the conversion example list, the recipe generation unit 130 generates a recipe based on the conversion examples.

FIG. 10 illustrates an example of a recipe generated by the first recipe generation. The recipe 51 illustrated in FIG. 10 includes an operator to "display city name in CamelCase".

The first line of the recipe 51 is an operator instructing to copy the first column of the data table 111 to a new column (third column). The second line of the recipe 51 is an operator instructing to display the value of the third column in CamelCase. The third line of the recipe 51 is an operator instructing to copy the second column to a new column (fourth column). The fourth line is an operator indicating that the value of the third column and the value of the fourth column are combined using "," to generate a new column (third column).

By the data conversion unit 140 executing the operators indicated in the recipe 51 on each record in the data table 111, first conversion is performed. The conversion result output unit 150 generates screen data of a conversion result check screen, and transmits the screen data to the terminal device 30. A conversion result check screen is displayed on the terminal device 30.

Figure 11:
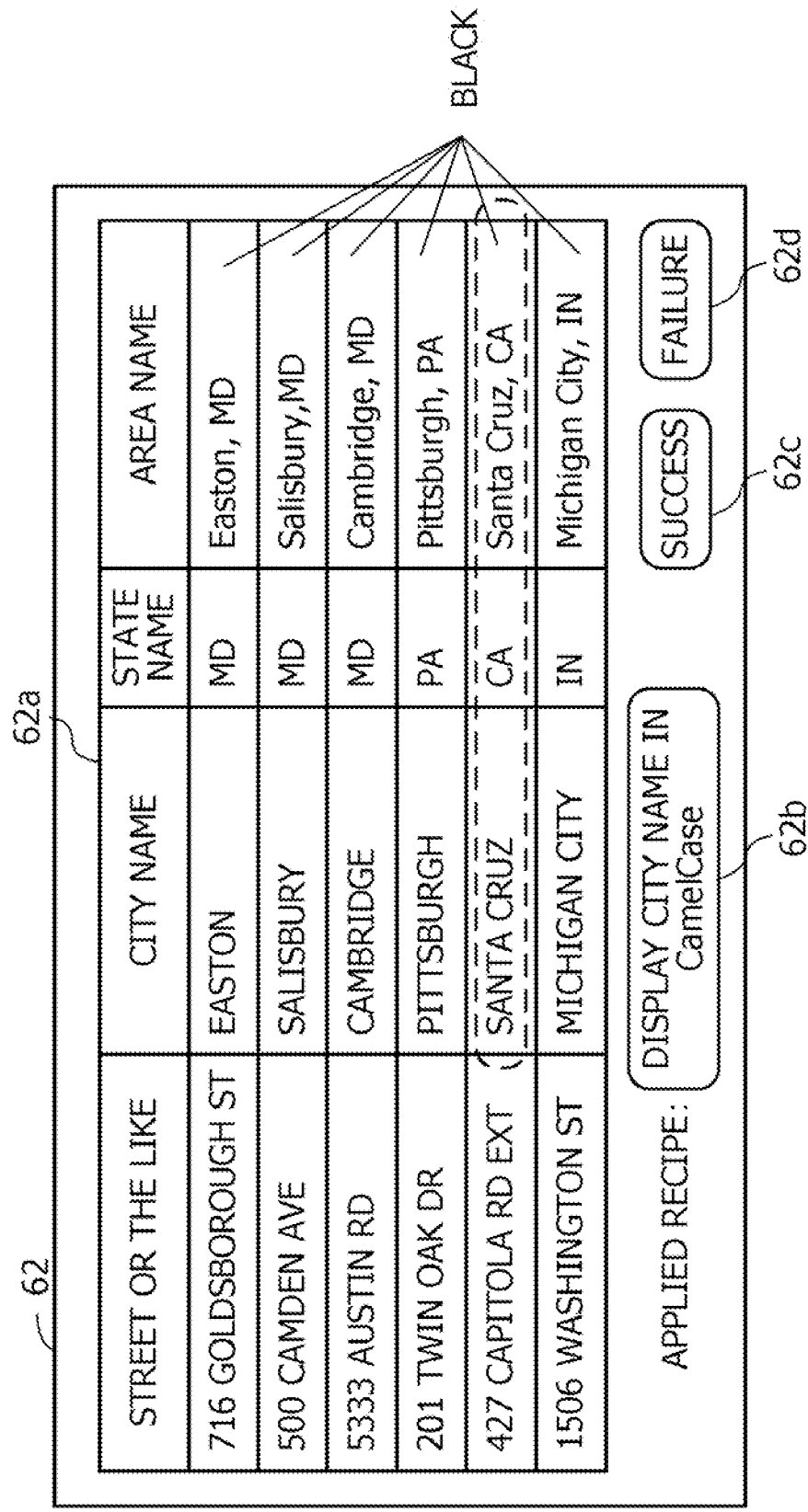
FIG. 11 illustrates an example of a conversion result check screen in the first conversion.

FIG. 11 illustrates an example of a conversion result check screen in the first conversion. A conversion result check screen 62 includes a data table display section 62*a*, a recipe display section 62*b*, and buttons 62*c* and 62*d*.

The data table display section 62*a* displays the values set in the fields of the records registered in the data table generated by the first conversion. In the generated data table, an "area name" column is added to the original data table 111 to be converted. Values generated by applying the recipe 51 to each record are set in the "area name" column. In the first conversion result, since there is no record for which it is checked whether the conversion result is correct, the values of "area name" of all records are displayed in black, for example, without being highlighted.

In the recipe display section 62*b*, a name indicating the applied recipe 51 is displayed. The button 62*c* is a button to be pressed when the conversion is successful (all records are converted into values as intended). When the button 62*c* is pressed, the latest data table is stored in the storage unit 110 as a conversion result. The button 62*d* is a button to be pressed when the conversion falls (there is a record converted into a value different from an intended value). When the button 62*d* is pressed, a conversion example input screen is displayed on the terminal device 30.

The user sequentially checks the records displayed in the data table display section 62*a* from the top to determine whether conversion is performed as intended. In the example of FIG. 11, the user recognizes that the fifth record is converted into a value different from an intended value. The user presses the button 62*d* indicating failure of the conversion.

When the button 62*d* is pressed, information indicating failure of the conversion is transmitted from the terminal device 30 to the server 100. The conversion example acquisition unit 120 of the server 100 generates screen data indicating a conversion example input screen for the second input of conversion examples, and transmits the screen data to the terminal device 30. The terminal device 30 displays a conversion example input screen for the second input of conversion examples.

FIG. 12 illustrates an example of the second conversion example input screen. A conversion example input screen 63 for the second input of conversion examples includes a data table display section 63*a*, a conversion example input section 63*b*, and a button 63*c*. The data table display section 63*a* displays the values set in the fields of the records registered in the original data table 111 to be converted.

The conversion example input section 63*b* is an area for inputting conversion examples. The conversion example input section 63*b* includes previous conversion results and text boxes for inputting conversion examples in association with the records. The button 63*c* is a button for instructing to execute conversion of the data table 111 based on conversion examples.

The user additionally inputs a correct conversion example as intended to the text box in the conversion example input section 63*b* corresponding to the fifth record in which a value different from an intended value is indicated as the previous conversion result. Next, the user presses the button 63*c*.

When the button 63*c* is pressed, a conversion example list including the conversion examples input to the conversion example input section 63*b* is transmitted from the terminal device 30 to the server 100. In the server 100 having received the conversion example list, the recipe generation unit 130 generates a recipe based on the conversion examples.

FIG. 13 illustrates an example of a recipe generated by the second recipe generation. The recipe 52 illustrated in FIG. 13 includes an operator to "select area name including city name".

The first line of the recipe 52 is an operator instructing to copy the first column of the data table 111 to a new column (third column). The second line of the recipe 52 is an operator for extracting, from a list of area names, area names that include the character string in the third column (city name) of the data table 111 to generate a list, and overwriting the third column. "GetCBSAListByCity" in the second line is a function for inquiring of the database of the CBSA (cbsa-list) the following query. SELECT cbsaname FROM cbsa-list WHERE cbsaname LIKE "%{city}%"

This query is to inquire a cbsa name that includes the city name set in a record in the data table 111. The third line of the recipe 52 is an operator for overwriting the third column with only the top element in the list of one or more elements set in the third column of the data table 111.

The operator in the second line of the recipe 52 extracts area names including the character string of the city name. However, in this processing, in a case where cities having the same city name exist in a plurality of states, there is a possibility that a CBSA of the wrong state is selected.

By the data conversion unit 140 executing the operators indicated in the recipe 52 on each record in the data table 111, second conversion is performed. The conversion result output unit 150 generates screen data of a conversion result check screen, and transmits the screen data to the terminal device 30. A conversion result check screen is displayed on the terminal device 30.

Figure 14:
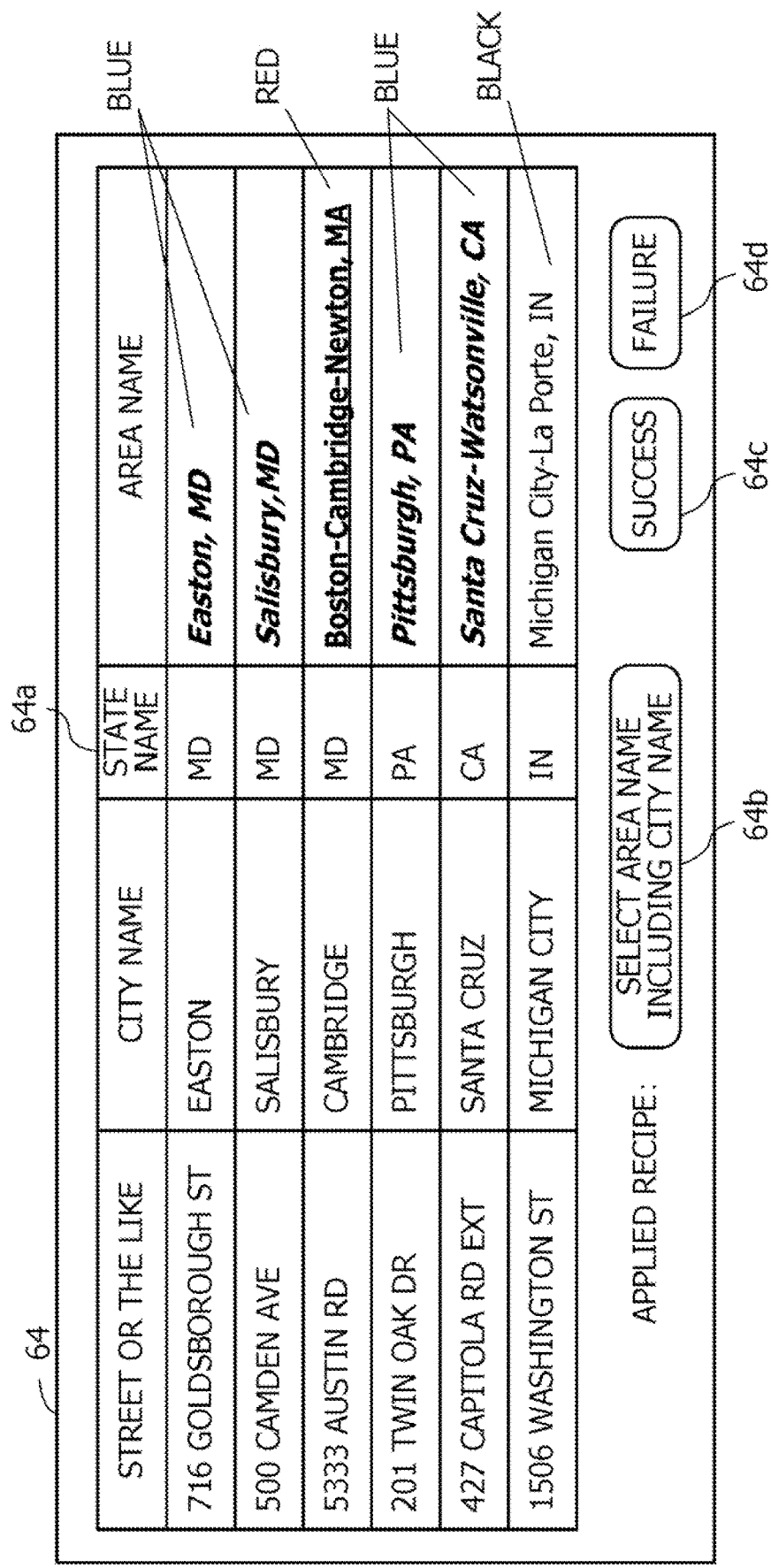
FIG. 14 illustrates an example of a conversion result check screen in the second conversion.

FIG. 14 illustrates an example of a conversion result check screen in the second conversion. A conversion result check screen 64 includes a data table display section 64*a*, a recipe display section 64*b*, and buttons 64*c* and 64*d*.

The data table display section 64*a* displays the values set in the fields of the records registered in the data table generated by the second conversion. In the generated data table, an "area name" column is added to the original data table 111 to be converted. Values generated by applying the recipe 52 to each record are set in the "area name" column.

In the conversion result check screen 64 for the second conversion, letters in the "area name" column are displayed in different colors according to the result of conversion. For example, for a checked record in which the value of the area name is the same as the value obtained in the previous conversion (excluding records for which a conversion example is currently added), the value of the area name is displayed in blue. For a checked record in which the value of the area name is different from the value obtained in the previous conversion (excluding records for which a conversion example is currently added), the value of the area name is displayed in red. Records for which a conversion example is currently added are displayed in blue when the conversion result matches the conversion example, and in red when the conversion result does not match the conversion example. The other values are displayed in black. In the example of FIG. 14, letters displayed in blue are written in bold and italic. Letters displayed in red are written in bold with an underline.

In the recipe display section 64*b*, a name indicating the applied recipe 52 is displayed. The button 64*c* is a button to be pressed when the conversion is successful. The button 64*d* is a button to be pressed when the conversion fails.

Since the value of the area name of the record in the third row of the data table display section 64*a* is displayed in red, the user may notice that the conversion result is incorrect without fail. The user presses the button 64*d* indicating failure of the conversion.

When the button 64*d* is pressed, information indicating failure of the conversion is transmitted from the terminal device 30 to the server 100. The conversion example acquisition unit 120 of the server 100 generates screen data indicating a conversion example input screen for the third input of conversion examples, and transmits the screen data to the terminal device 30. The terminal device 30 displays a conversion example input screen for the third input of conversion examples.

FIG. 15 illustrates an example of the third conversion example input screen. A conversion example input screen 65 for the third input of conversion examples includes a data table display section 65*a*, a conversion example input section 65*b*, and a button 65*c*. The data table display section

65a displays the values set in the fields of the records registered in the original data table 111 to be converted.

The conversion example input section 65b is an area for inputting conversion examples. The conversion example input section 65b includes previous conversion results and text boxes for inputting conversion examples in association with the records. The button 65c is a button for instructing to execute conversion of the data table 111 based on conversion examples.

The user additionally inputs a correct conversion example as intended to the text box in the conversion example input section 65b corresponding to the third record in which a value different from an intended value is indicated as the previous conversion result. Next, the user presses the button 65c.

When the button 65c is pressed, a conversion example list including the conversion examples input to the conversion example input section 65b is transmitted from the terminal device 30 to the server 100. In the server 100 having received the conversion example list, the recipe generation unit 130 generates a recipe based on the conversion examples.

FIG. 16 illustrates an example of a recipe generated by the third recipe generation. The recipe 53 illustrated in FIG. 16 includes an operator to "obtain area name from city name and state name".

The first line of the recipe 53 is an operator instructing to copy the first column of the data table 111 to a new column (third column). The second line of the recipe 53 is an operator for extracting, from a list of area names, area names that include the character string in the third column (city name) of the data table 111, and in which the state name matches the character string in the second column (state name), and overwriting the third column. Since it is considered that a plurality of cities with the same city name do not exist in the same state, this operator may narrow down possible area names to one area name. "GetCBSAName-ByCityAndState" in the second line is a function for inquiring of the database of the CBSA (cbsa-list) the following query. SELECT cbsaname FROM cbsa-list WHERE cbsaname LIKE "%{city}%" and statename="{state}"

This query is to inquire a cbsa name that includes the city name set in a record in the data table 111, and the same state name as the state name set in the record in the data table 111.

By the data conversion unit 140 executing the operators indicated in the recipe 53 on each record in the data table 111, third conversion is performed. The conversion result output unit 150 generates screen data of a conversion result check screen, and transmits the screen data to the terminal device 30. A conversion result check screen is displayed on the terminal device 30.

Figure 17:
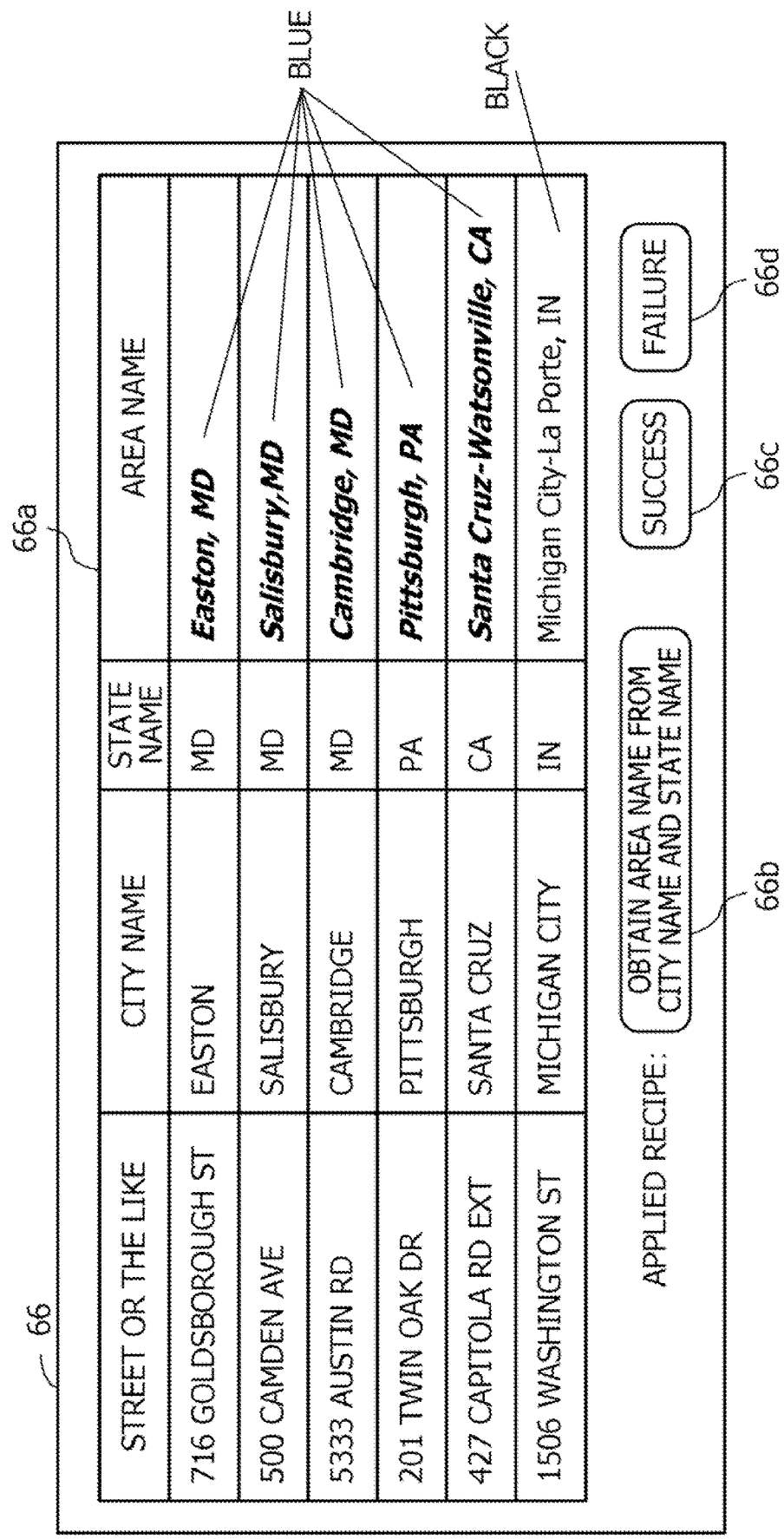
FIG. 17 illustrates an example of a conversion result check screen in the third conversion.

FIG. 17 illustrates an example of a conversion result check screen in the third conversion. A conversion result check screen 66 includes a data table display section 66a, a recipe display section 66b, and buttons 66c and 66d.

The data table display section 66a displays the values set in the fields of the records registered in the data table generated by the third conversion. In the generated data table, an "area name" column is added to the original data table 111 to be converted. Values generated by applying the recipe 53 to each record are set in the "area name" column.

In the conversion result check screen 66 for the third conversion, letters in the "area name" column are displayed in different colors according to the result of conversion. For example, the value of the area name of the record that has been checked by the user is displayed in blue. The other values are displayed in black. In the example of FIG. 17, since there is no checked record in which the value of the area name is different from the value obtained in the previous conversion (excluding records for which a conversion example is currently added), there is no record in which the value of the area name is displayed in red. In the example of FIG. 17, letters displayed in blue are written in bold and italic.

In the recipe display section 66b, a name indicating the applied recipe 53 is displayed. The button 66c is a button to be pressed when the conversion is successful. The button 66d is a button to be pressed when the conversion fails.

The user sequentially checks the records displayed in the data table display section 66a from the top to determine whether conversion is performed as intended. In the example of FIG. 17, all records are converted as intended by the user. The user presses the button 66c indicating success of the conversion.

When the button 66c is pressed, information indicating success of the conversion is transmitted from the terminal device 30 to the server 100. The conversion result output unit 150 of the server 100 stores, in the storage unit 110, the data table generated by the third conversion.

In this way, based on the original data table 111 to be converted, a data table, in which a column including the value (character string indicating a CBSA) as intended by the user is added, may be generated. When a data table is regenerated, by highlighting the value of a checked record in which the value is different from the value obtained in the previous conversion, an oversight by the user in checking the records may be suppressed. For example, when a data table is repeatedly converted and it is checked whether the data table is correctly converted every time, checking of records that have already been checked tends to be careless. By highlighting the value of a record in which there is a high possibility of incorrect conversion, an oversight of incorrectness by a user may be suppressed.

In the example of PBE described above, the data table 111 in which English character strings are set is converted, but the PBE technique may also be used in a case of converting a data table in which Japanese character strings are set.

FIG. 18 illustrates an example of a data table in which Japanese character strings are set. A data table 111a illustrated in FIG. 18 includes columns of address, building name, and phone number. A record in the data table 111a includes a field corresponding to each column. The address of the place where a building is built is set in the address column. The name of a building is set in the building name column. The phone number of the organization using the corresponding building is set in the phone number column.

Figure 19:
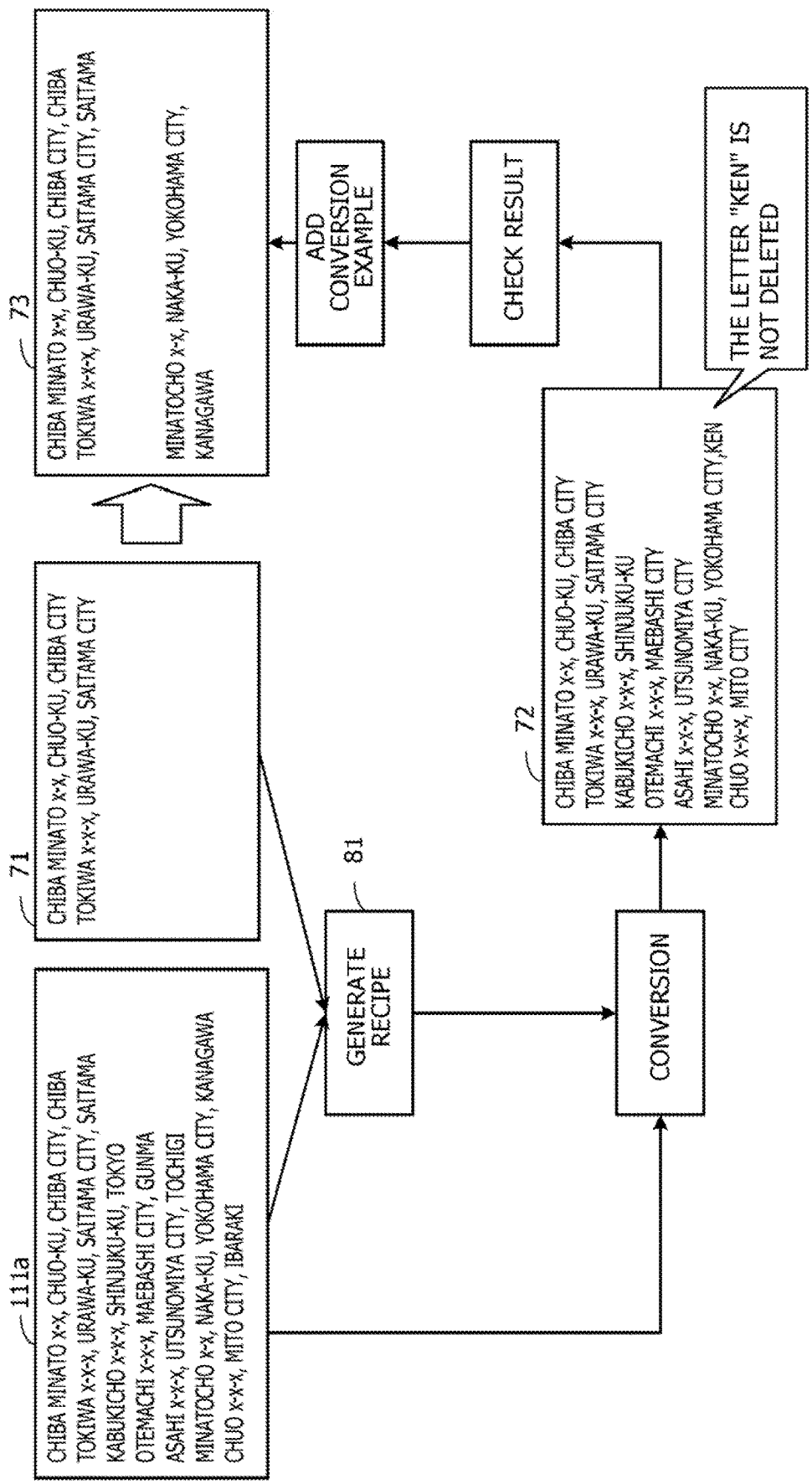
FIG. 19 illustrates an example of checking a conversion result of a Japanese data table.

FIG. 19 illustrates an example of checking a conversion result of a Japanese data table. FIG. 19 illustrates an example of a case where an address with a prefecture name omitted is generated based on an address. For example, it is assumed that a user inputs, to a conversion example list 71, "Chiba Minato x-x, Chuo-ku, Chiba City" as the value converted from "Chiba Minato x-x, Chuo-ku, Chiba City, Chiba" and "Tokiwa x-x-x, Urawa-ku, Saitama City" as the value converted from "Tokiwa x-x-x, Urawa-ku, Saitama City, Saitama", as conversion examples. The recipe generation unit 130 of the server 100 generates a recipe for converting the value of each record in the data table 111a in accordance with the conversion examples indicated in the conversion example list 71. For example, it is assumed that a conversion rule of "delete three letters from beginning" is generated as a recipe 81.

When the recipe 81 is generated, the data conversion unit 140 converts the addresses in the data table 111a in accordance with the recipe 81. A new data table 72 is generated as a conversion result. The data table 72 as the conversion result is transmitted to the terminal device 30 by the conversion result output unit 150 and displayed on the screen of the terminal device 30.

The user checks the conversion result based on the data table 72 displayed on the terminal device 30. For example, the user checks the correctness of the conversion results sequentially from the top record of the data table 72. The conversion intended by the user is conversion of deleting a prefecture name from an address. In the example of FIG. 19, the letter "ken" is not deleted from "Minatocho x-x, Naka-ku, Yokohama City, ken" included in the data table 72. In this case, the user adds, as a conversion example, "Minatocho x-x, Naka-ku, Yokohama City" obtained by deleting the prefecture name from "Minatocho x-x, Naka-ku, Yokohama City, Kanagawa" to the conversion example list 73.

Also for the Japanese data table 111a, conversion as intended by a user may be achieved by causing the server 100 to repeatedly execute addition of a conversion example, generation of a recipe, and conversion of the data table 111a based on the recipe. The processing procedure is as illustrated in FIG. 7.

Figure 20:
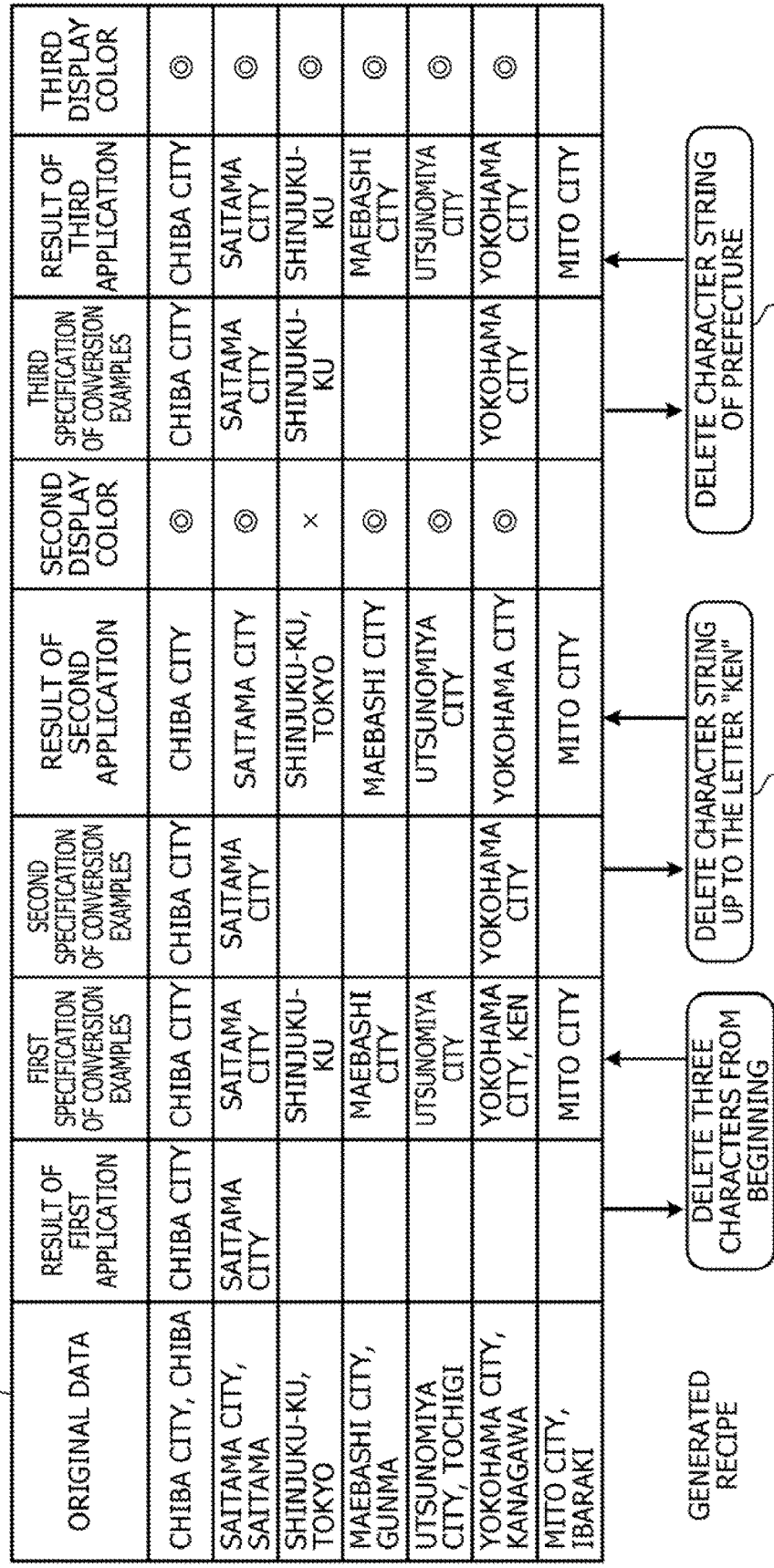
FIG. 20 illustrates an example of a conversion history of records in a Japanese data table obtained by repeating conversion.

FIG. 20 illustrates an example of a conversion history of records in a Japanese data table obtained by repeating conversion. In a conversion history 80, conversion examples and conversion results, which are obtained by applying recipes 81 to 83 generated based on the conversion examples, are indicated in association with original records to be converted. In the example illustrated in FIG. 20, three recipes 81 to 83 are generated by specifying conversion examples three times. It is assumed that the conversion intended by a user is conversion of deleting a prefecture name from an address. In the example of FIG. 20, details of an address after a city name are omitted.

In the first specification of conversion examples, a conversion example of converting "Chiba City, Chiba" into "Chiba City" and a conversion example of converting "Saitama City, Saltama" into "Saltama City" are specified. In the example of FIG. 20, the recipe 81 in which an operator of "delete three letters from beginning" is described is generated based on the two conversion examples.

By applying the recipe 81 to convert the value of each record, the records for which a conversion example is specified are converted as in the conversion example. When the user checks the conversion results sequentially from the top record, the user notices that the sixth record is converted incorrectly. The sixth record is converted from "Yokohama City, Kanagawa" to "Yokohama City, ken", and the letter "ken" is left.

The user additionally specifies a conversion example "Yokohama City" for the sixth record. In the example of FIG. 20, the recipe 82 in which an operator of "delete character string up to the letter "ken"" is described is generated based on the second specification of conversion examples.

By applying the recipe 82 to convert the value of each record, the records for which a conversion example is specified are converted as in the conversion example. Records from the first record to the sixth record, for which a conversion example is additionally specified, are checked records for which the user has checked the previous conversion result. The value of the third record among the checked records is converted into a value different from that in the previous conversion. Since the conversion result determined to be correct in the previous conversion is changed to a different conversion result, there is a high possibility that the second conversion result for this record is incorrect.

Although the value of the sixth record is converted into a value different from that in the previous conversion, this record is a record for which a conversion example is specified, and is a record in which the previous conversion result was incorrect. The sixth record is converted as in the conversion example, and the second conversion result is correct.

For example, the conversion result output unit 150 highlights the checked records in which the conversion result has been changed from the previous conversion result (excluding records for which a conversion example is currently added) by displaying the checked records in red. This may suppress an oversight of incorrect conversion for the third record when the user performs checking.

For example, the conversion result output unit 150 displays the checked records in which the conversion result has not been changed from the previous conversion result in a color different from the color (for example, black) of the other records by displaying the checked records in blue. Thus, the user may recognize checked records, and may easily identify records for which it has already been checked that conversion is correct and in which the same conversion result is obtained in the second conversion.

When the user finds that the conversion result is incorrect for the third record, the user additionally specifies a conversion example "Shinjuku-ku" for the record. In the example of FIG. 20, the recipe 83 in which an operator of "delete character string of prefecture" is described is generated based on the third specification of conversion examples.

By applying the recipe 83 to convert the value of each record, the records for which a conversion example is specified are converted as in the conversion example. Records from the first record to the sixth record, for which a conversion example has been additionally specified in the past, are checked records for which the user has checked previous conversion results. The value of the third record among the checked records is converted into a value different from that in the previous conversion, but this is a record for which a conversion example is additionally specified. The conversion result output unit 150 displays the checked record in a color different from the color (for example, black) of the other records by displaying the checked record in blue.

Hereinafter, with reference to FIGS. 21 to 29, detailed description will be given for user operation and recipes to be generated in conversion processing of the data table 111a by PBE as illustrated in FIG. 20. In the following example, the data table 111a is input (column 0: address, column 1: building name, column 2: phone number), and a data table obtained by deleting prefecture names from the addresses in the data table 111a is output (column 0: address (excluding prefecture), column 1: building name, column 2: phone number).

For example, a user operates the terminal device 30 to instruct the server 100 to generate a data table of "column 0: address (excluding prefecture), column 1: building name, column 2: phone number" based on the data table 111a. The conversion example acquisition unit 120 of the server 100 generates screen data of a conversion example input screen based on the data table 111a, and transmits the screen data to the terminal device 30. The conversion example input screen is displayed on the terminal device 30.

FIG. 21 illustrates an example of a conversion example input screen for the first input of Japanese conversion examples. A conversion example input screen 91 includes a data table display section 91a, a conversion example input section 91b, and a button 91c. The data table display section 91a displays the values set in the fields of the records registered in the original data table 111a to be converted.

The conversion example input section 91b is an area for inputting conversion examples. The conversion example input section 91b includes text boxes for inputting conversion examples in association with the records. The button 91c is a button for instructing to execute conversion of the data table 111a based on conversion examples.

The user inputs a conversion example for the corresponding record to any one or more text boxes of the conversion example input section 91b. In the example of FIG. 21, a conversion example is input for the first and second records. Next, the user presses the button 91c.

When the button 91c is pressed, a conversion example list including the conversion examples input to the conversion example input section 91b is transmitted from the terminal device 30 to the server 100. In the server 100 having received the conversion example list, the recipe generation unit 130 generates a recipe based on the conversion examples.

FIG. 22 illustrates an example of a recipe for Japanese conversion generated by the first recipe generation. The recipe 81 illustrated in FIG. 22 includes an operator to "delete three letters from beginning".

The operator indicated in the recipe 81 is an instruction to remove the first three letters from the character strings in the first column (address) and return the character strings to the column.

By the data conversion unit 140 executing the operators indicated in the recipe 81 on each record in the data table 111a, first conversion is performed. The conversion result output unit 150 generates screen data of a conversion result check screen, and transmits the screen data to the terminal device 30. A conversion result check screen is displayed on the terminal device 30.

Figure 23:
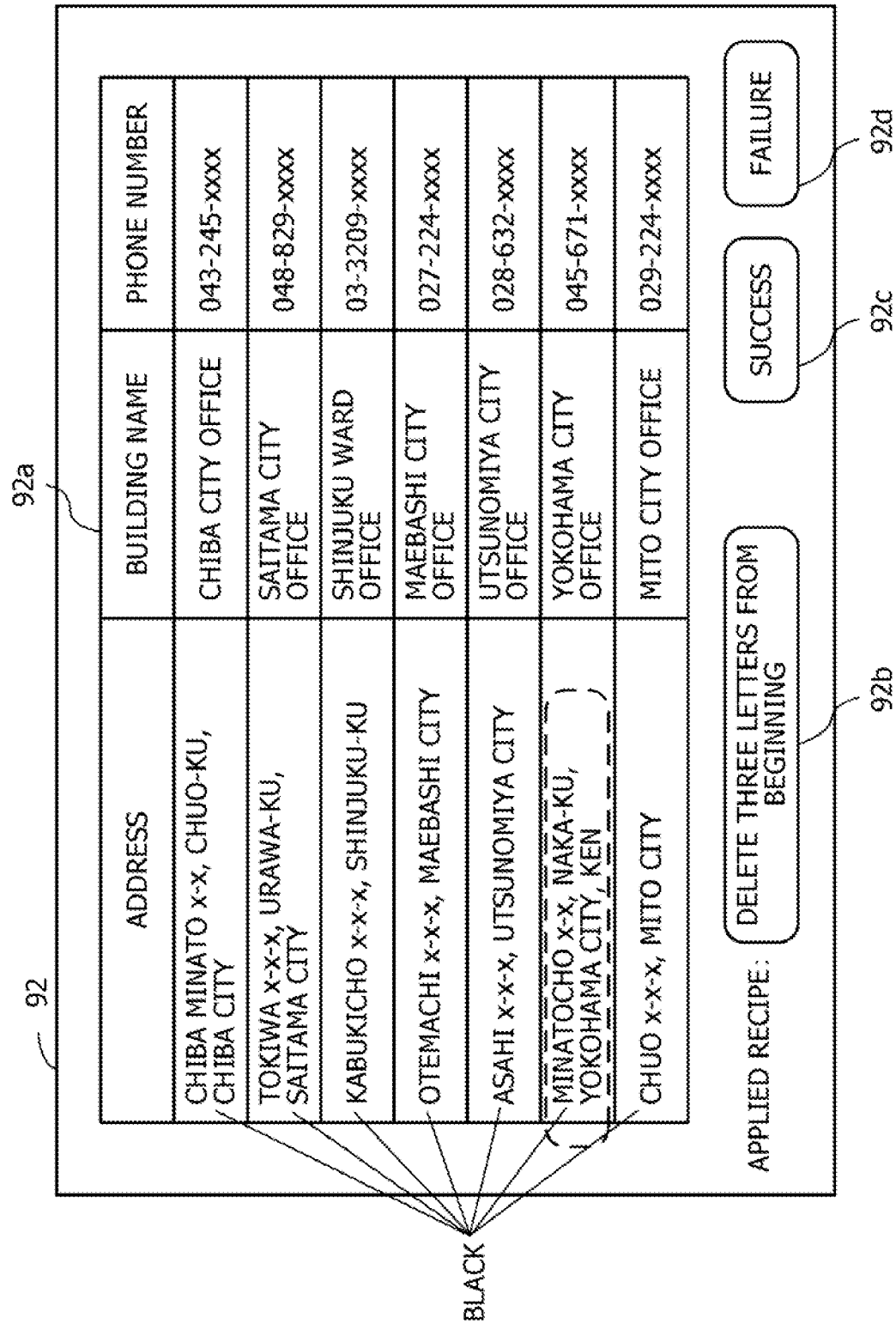
FIG. 23 illustrates an example of a conversion result check screen in the first Japanese conversion.

FIG. 23 illustrates an example of a conversion result check screen in the first Japanese conversion. A conversion result check screen 92 includes a data table display section 92a, a recipe display section 92b, and buttons 92c and 92d.

The data table display section 92a displays the values set in the fields of the records registered in the data table generated by the first conversion. In the first conversion result, since there is no record for which it is checked whether the conversion result is correct, the values of "address" of all records are displayed in black, for example, without being highlighted. In the recipe display section 92b, a name indicating the applied recipe 81 is displayed. The button 92c is a button to be pressed when the conversion is successful. The button 92d is a button to be pressed when the conversion fails.

The user sequentially checks the records displayed in the data table display section 92a from the top to determine whether conversion is performed as intended. In the example of FIG. 23, the user recognizes that the sixth record is converted into a value different from an intended value. The user presses the button 92d indicating failure of the conversion.

When the button 92d is pressed, information indicating failure of the conversion is transmitted from the terminal device 30 to the server 100. The conversion example acquisition unit 120 of the server 100 generates screen data indicating a conversion example input screen for the second input of Japanese conversion examples, and transmits the screen data to the terminal device 30. The terminal device 30 displays a conversion example input screen for the second input of Japanese conversion examples.

FIG. 24 illustrates an example of the second Japanese conversion example input screen. A conversion example input screen 93 for the second input of conversion examples includes a data table display section 93a, a conversion example input section 93b, and a button 93c. The data table display section 93a displays the values set in the fields of the records registered in the original data table 111a to be converted.

The conversion example input section 93b is an area for inputting conversion examples. The conversion example input section 93b includes previous conversion results and text boxes for inputting conversion examples in association with the records. The button 93c is a button for instructing to execute conversion of the data table 111a based on conversion examples.

The user additionally inputs a correct conversion example as intended to the text box in the conversion example input section 93b corresponding to the sixth record in which a value different from an intended value is indicated as the previous conversion result. Next, the user presses the button 93c.

When the button 93c is pressed, a conversion example list including the conversion examples input to the conversion example input section 93b is transmitted from the terminal device 30 to the server 100. In the server 100 having received the conversion example list, the recipe generation unit 130 generates a recipe based on the conversion examples.

FIG. 25 illustrates an example of a recipe for Japanese conversion generated by the second recipe generation. The recipe 82 illustrated in FIG. 25 includes an operator to "delete character string up to the letter "ken"".

The operator indicated in the recipe 82 is an instruction to remove letters from the beginning to the letter "ken" (including the letter "ken") from the character strings in the first column (address) of the data table 111a and return the character strings to the column. By the data conversion unit 140 executing the operators indicated in the recipe 82 on each record in the data table 111a, second conversion is performed. The conversion result output unit 150 generates screen data of a conversion result check screen, and transmits the screen data to the terminal device 30. A conversion result check screen is displayed on the terminal device 30.

FIG. 26 illustrates an example of a conversion result check screen in the second Japanese conversion. A conversion result check screen 94 includes a data table display section 94a, a recipe display section 94b, and buttons 94c and 94d.

The data table display section 94a displays the values set in the fields of the records registered in the data table generated by the second conversion. In the conversion result check screen 94 for the second conversion, letters in the "address" column are displayed in different colors according to the result of conversion. For example, for a checked record in which the value of the address is the same as the value obtained in the previous conversion (excluding records for which a conversion example is currently added), the value of the address is displayed in blue. For a checked record in which the value of the address is different from the value obtained in the previous conversion (excluding records for which a conversion example is currently added), the value of the address is displayed in red. Records for which a conversion example is currently added are displayed in blue when the conversion result matches the conversion example, and in red when the conversion result does not match the conversion example. The other values are displayed in black. In the example of FIG. 26, letters displayed in blue are written in bold and italic. Letters displayed in red are written in bold with an underline.

In the recipe display section 94b, a name indicating the applied recipe 82 is displayed. The button 94c is a button to be pressed when the conversion is successful. The button 94d is a button to be pressed when the conversion fails.

Since the value of the address of the record in the third row of the data table display section 94a is displayed in red, the user may notice that the conversion result is incorrect without fail. The user presses the button 94d indicating failure of the conversion.

When the button 94d is pressed, information indicating failure of the conversion is transmitted from the terminal device 30 to the server 100. The conversion example acquisition unit 120 of the server 100 generates screen data indicating a conversion example input screen for the third input of Japanese conversion examples, and transmits the screen data to the terminal device 30. The terminal device 30 displays a conversion example input screen for the third input of Japanese conversion examples.

FIG. 27 illustrates an example of the third Japanese conversion example input screen. A conversion example input screen 95 for the third input of conversion examples includes a data table display section 95a, a conversion example input section 95b, and a button 95c. The data table display section 95a displays the values set in the fields of the records registered in the original data table 111a to be converted.

The conversion example input section 95b is an area for inputting conversion examples. The conversion example input section 95b includes previous conversion results and text boxes for inputting conversion examples in association with the records. The button 95c is a button for instructing to execute conversion of the data table 111a based on conversion examples.

The user additionally inputs a correct conversion example as intended to the text box in the conversion example input section 95b corresponding to the third record in which a value different from an intended value is indicated as the previous conversion result. Next, the user presses the button 95c.

When the button 95c is pressed, a conversion example list including the conversion examples input to the conversion example input section 95b is transmitted from the terminal device 30 to the server 100. In the server 100 having received the conversion example list, the recipe generation unit 130 generates a recipe based on the conversion examples.

Figure 28:
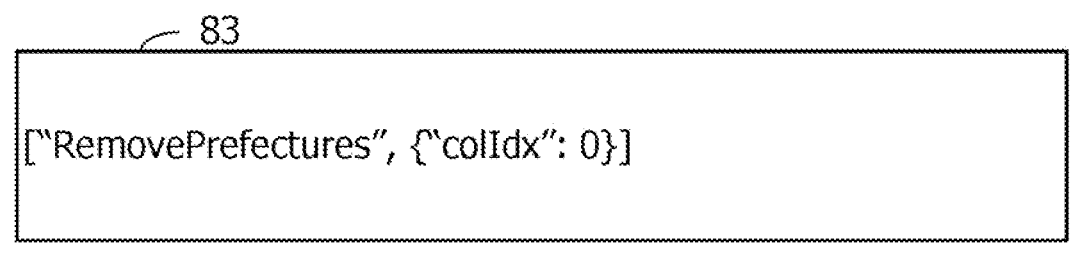

FIG. 28 illustrates an example of a recipe for Japanese conversion generated by the third recipe generation. The recipe 83 illustrated in FIG. 28 includes an operator to "delete character string of prefecture".

The operator indicated in the recipe 83 is an instruction to remove a character string from the beginning that matches a prefecture name (including the letter of "to", "do", "fu", or "ken") from the character strings in the first column (address) of the data table 111a and return the character strings to the column. In this operator, if a character string of up to four letters from the beginning does not match a prefecture name, the value is returned to the first column as it is.

Inside the operator (function) executed in the recipe 83, it is determined whether a character string ("char" in the following example) cut out from the beginning in the first column is included in a list of prefecture names (prefname) (pref-list). For example, the determination is performed by executing the following inquiry. SELECT prefname FROM pref-list WHERE prefname="{char}"

By the data conversion unit 140 executing the operators indicated in the recipe 83 on each record in the data table 111a, third conversion is performed. The conversion result output unit 150 generates screen data of a conversion result check screen, and transmits the screen data to the terminal device 30. A conversion result check screen is displayed on the terminal device 30.

Figure 29:
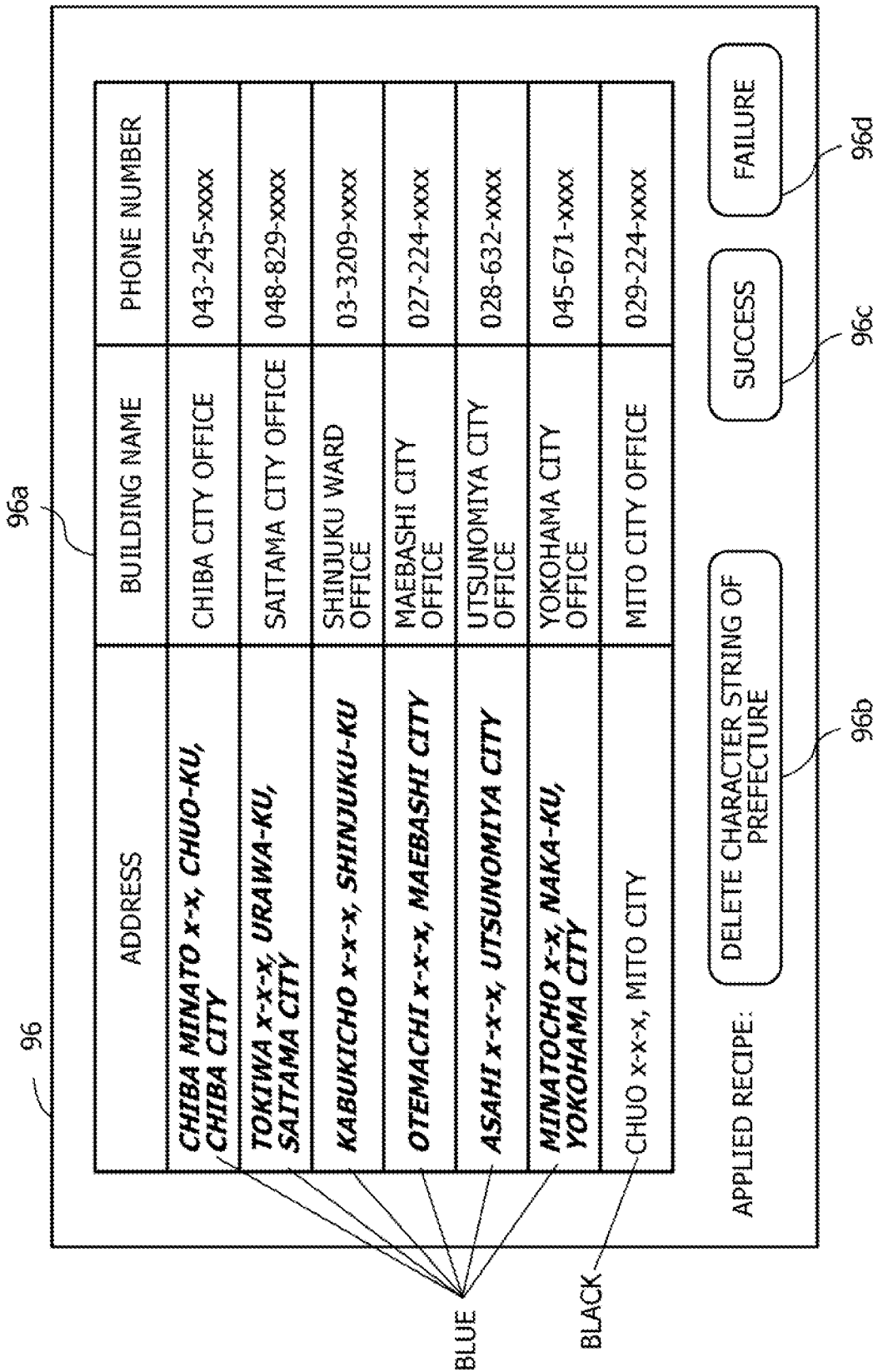
FIG. 29 illustrates an example of a conversion result check screen in the third Japanese conversion.

FIG. 29 illustrates an example of a conversion result check screen in the third Japanese conversion. A conversion result check screen 96 includes a data table display section 96a, a recipe display section 96b, and buttons 96c and 96d.

The data table display section 96a displays the values set in the fields of the records registered in the data table generated by the third conversion. In the conversion result check screen 96 for the third conversion, letters in the "address" column are displayed in different colors according to the result of conversion. For example, the value of the address of the record that has been checked by the user is displayed in blue. The other values are displayed in black. In the example of FIG. 29, since there is no checked record in which the value of the address is different from the value obtained in the previous conversion (excluding records for which a conversion example is currently added), there is no record in which the value of the address is displayed in red. In the example of FIG. 29, letters displayed in blue are written in bold and italic.

In the recipe display section 96b, a name indicating the applied recipe 83 is displayed. The button 96c is a button to be pressed when the conversion is successful. The button 96d is a button to be pressed when the conversion fails.

The user sequentially checks the records displayed in the data table display section 96a from the top to determine whether conversion is performed as intended. In the example of FIG. 29, all records are converted as intended by the user. The user presses the button 96c indicating success of the conversion.

When the button 96c is pressed, information indicating success of the conversion is transmitted from the terminal device 30 to the server 100. The conversion result output unit 150 of the server 100 stores, in the storage unit 110, the data table generated by the third conversion.

In this way, the data table 111a in which records are registered in Japanese may also be appropriately converted by using the PBE technique. Since the values of checked records in a data table generated in the process of improving a recipe are highlighted when the values are different from those in the previous conversion, an oversight of an incorrect conversion result may be suppressed.

Other Embodiments

In the second embodiment, conversion examples of a data table in which English character strings are registered and conversion examples of a data table in which Japanese character strings are registered are described. However, the processing according to the second embodiment is also applicable to a case of converting a data table in which character strings of another language are registered.

In the second embodiment, a record for which a conversion example is specified is converted as in the conversion example, but there may be a case where a record for which a conversion example is specified may not be converted as in the conversion example. The conversion result output unit 150 of the server 100 may also highlight the value of a record for which a conversion example is specified when the converted value is different from the specified conversion example. Accordingly, in a case where the value of a record for which a conversion example is specified is converted into a value different from the conversion example, it is possible to notify a user that the conversion is not performed as in the conversion example.

While the embodiments are exemplified above, the configuration of each unit described in the embodiments may be replaced with another configuration having substantially the same function. Any other constituents or processes may be added. Any two or more of the configurations (features) described in the embodiments above may be combined with each other.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium for storing data processing program which causes a processor to perform processing, the processing comprising:

generating, in response to input of first conversion examples corresponding to some records of a plurality of records, a first conversion program configured to convert a value of each of the plurality of records in a way derived from comparing the inputted first conversion examples with the some records of the plurality of records, each of the first conversion examples being a conversion example indicating a converted value from a value set in a corresponding record of the some records;

obtaining a first conversion result by applying the generated first conversion program to a value of each of the plurality of records, the first conversion result including converted values obtained by the applying of the generated first conversion program;

displaying the first conversion result obtained by using the first conversion program, the first conversion result being displayed in a list form so as to allow a user to review in an order from upper side to lower side in the list form whether each converted value is correctly converted;

generating, in response to adding of a second conversion example corresponding to any of the plurality of records, a second conversion program configured to convert a value of each of the plurality of records in a way derived from the first conversion examples and the added second conversion example;

obtaining a second conversion result by applying the generated second conversion program to a value of each of the plurality of records, the second conversion result including converted values obtained by the applying of the generated second conversion program;

selecting one or more second records from among the plurality of records, each of the one or more second records being a record on an upper side of a first record and having been reviewed by the user, the first record being a record for which the second conversion example is added;

obtaining a determination result by determining whether a value of each of the one or more second records is changed in the second conversion result in comparison with the first conversion result; and in response to the determination result indicating that a value of any of the one or more second records is changed, displaying the second conversion result to highlight the value of the any of the one or more second records.

2. The non-transitory computer-readable storage medium according to claim 1, wherein the selecting of the one or more second records includes selecting, in a case where there are a plurality of first records each of which is a record for which the second conversion example is added, a lowest first record that is lowest among the plurality of first records, and using the selected lowest first record as the first record in the selecting of the one or more second records.

3. The non-transitory computer-readable storage medium according to claim 2, wherein the selecting of the one or more second records further includes excluding, from the one or more second records, the plurality of first records other than the selected lower first record.

4. The non-transitory computer-readable storage medium according to claim 1, wherein a record displayed at an upper position among the plurality of records is an upper record.

5. The non-transitory computer-readable storage medium according to claim 1, wherein the displaying of the second conversion result includes displaying, in a first display mode, a value of a record lower than the first record, displaying, in a second display mode different from the first display mode, a value of an unchanged second record that is, among the one or more second records, a second record that is not changed in the second conversion result from a value of the first conversion result, and displaying, in a third display mode different from the first display mode and the second display mode, a value of a changed second record that is, among the one or more second records, a second record that is changed in the second conversion result from a value of the first conversion result.

6. A computer-based method of data processing, the method comprising:

generating, in response to input of first conversion examples corresponding to some records of a plurality of records, a first conversion program configured to convert a value of each of the plurality of records in a way derived from comparing the inputted first conversion examples with the some records of the plurality of records, each of the first conversion examples being a conversion example indicating a converted value from a value set in a corresponding record of the some records;

obtaining a first conversion result by applying the generated first conversion program to a value of each of the plurality of records, the first conversion result including converted values obtained by the applying of the generated first conversion program;

displaying the first conversion result obtained by using the first conversion program, the first conversion result being displayed in a list form so as to allow a user to review in an order from upper side to lower side in the list form whether each converted value is correctly converted;

generating, in response to adding of a second conversion example corresponding to any of the plurality of records, a second conversion program configured to convert a value of each of the plurality of records in a way derived from the first conversion examples and the added second conversion example;

obtaining a second conversion result by applying the generated second conversion program to a value of each of the plurality of records, the second conversion result including converted values obtained by the applying of the generated second conversion program;

selecting one or more second records from among the plurality of records, each of the one or more second records being a record on an upper side of a first record and having been reviewed by the user, the first record being a record for which the second conversion example is added;

obtaining a determination result by determining whether a value of each of the one or more second records is changed in the second conversion result in comparison with the first conversion result; and in response to the determination result indicating that a value of any of the one or more second records is changed, displaying the second conversion result to highlight the value of the any of the one or more second records.

7. A data processing apparatus comprising:

a memory configured to store tabular data including a plurality of records registered; and a processor coupled to the memory, the processor being configured to perform processing, the processing including:

generating, in response to input of first conversion examples corresponding to some records of a plurality of records, a first conversion program configured to convert a value of each of the plurality of records in a way derived from comparing the inputted first conversion examples with the some records of the plurality of records, each of the first conversion examples being a conversion example indicating a converted value from a value set in a corresponding record of the some records;

obtaining a first conversion result by applying the generated first conversion program to a value of each of the plurality of records, the first conversion result including converted values obtained by the applying of the generated first conversion program;

displaying the first a conversion result obtained by using the first conversion program, the first conversion result being displayed in a list form so as to allow a user to review in an order from upper side to lower side in the list form whether each converted value is correctly converted;

generating, in response to adding of a second conversion example corresponding to any of the plurality of records, a second conversion program configured to convert a value of each of the plurality of records in a way derived from the first conversion examples and the added second conversion example;

obtaining a second conversion result by applying the generated second conversion program to a value of each of the plurality of records, the second conversion result including converted values obtained by the applying of the generated second conversion program;

selecting one or more second records from among the plurality of records, each of the one or more second records being a record on an upper side of a first record and having been reviewed by the user, the first record being a record for which the second conversion example is added;

obtaining a determination result by determining whether a value of each of the one or more second records is changed in the second conversion result in comparison with the first conversion result; and in response to the determination result indicating that a value of any of the one or more second records is changed, displaying the second conversion result to highlight the value of the any of the one or more second records.

* * * * *